United States Patent
Li et al.

(10) Patent No.: US 12,267,754 B2
(45) Date of Patent: Apr. 1, 2025

(54) COMMUNICATIONS METHOD AND APPARATUS

(71) Applicant: Huawei Technologies Co., Ltd., Shenzhen (CN)

(72) Inventors: Chao Li, Beijing (CN); Junwei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 611 days.

(21) Appl. No.: 17/452,181

(22) Filed: Oct. 25, 2021

(65) Prior Publication Data

US 2022/0043097 A1    Feb. 10, 2022

Related U.S. Application Data

(63) Continuation of application No. PCT/CN2020/075135, filed on Feb. 13, 2020.

(30) Foreign Application Priority Data

Apr. 26, 2019   (CN) .......................... 201910346068.8

(51) Int. Cl.
*H04W 24/00* (2009.01)
*H04L 1/1812* (2023.01)
*H04W 4/40* (2018.01)
*H04W 72/20* (2023.01)
(Continued)

(52) U.S. Cl.
CPC ............. *H04W 4/40* (2018.02); *H04L 1/1812* (2013.01); *H04W 72/20* (2023.01); *H04W 72/542* (2023.01); *H04W 92/18* (2013.01)

(58) Field of Classification Search
CPC ..... H04W 4/40; H04W 72/20; H04W 72/542; H04W 92/18; H04W 4/023; H04W 4/021; H04W 4/70; H04L 1/1812; H04L 1/1657; H04L 1/1896; H04L 5/006; H04L 5/0057;
(Continued)

(56) References Cited

U.S. PATENT DOCUMENTS

| 8,798,642 B2 | 8/2014 | Lee | |
|---|---|---|---|
| 9,973,892 B1* | 5/2018 | Parshin | ................ H04W 68/06 |
| 2002/0161737 A1* | 10/2002 | Chi | ........................ H04L 7/042 |

(Continued)

FOREIGN PATENT DOCUMENTS

| CN | 105407460 A | 3/2016 |
|---|---|---|
| CN | 107659915 A | 2/2018 |

(Continued)

OTHER PUBLICATIONS

LG Electronics Inc., "Zone-based Flight Path Reporting", 3GPP TSG RAN WG2 #103, R2-1812580, Gothenburg, Sweden, Aug. 20-24, 2018, 4 pages.

(Continued)

*Primary Examiner* — Stephen M D Agosta
(74) *Attorney, Agent, or Firm* — Slater Matsil, LLP

(57) ABSTRACT

A first device determines, based on a location of the first device and a quality of service parameter of first data, an identity of a first zone in which the first device is located, where the first data is data sent by the first device. The first device sends indication information, where the indication information includes first information, and the first information indicates the identity of the first zone.

17 Claims, 10 Drawing Sheets

(51) Int. Cl.
  *H04W 72/542*  (2023.01)
  *H04W 92/18*  (2009.01)
(58) Field of Classification Search
  CPC ... H04L 5/0091; H04L 1/1607; H04L 5/0055; G01S 11/06; G01S 5/0054
  See application file for complete search history.

(56) References Cited

U.S. PATENT DOCUMENTS

| | | | | |
|---|---|---|---|---|
| 2010/0144367 | A1* | 6/2010 | Goh | G01S 5/0294 455/456.1 |
| 2010/0210259 | A1* | 8/2010 | Morales Barbosa | H04M 3/42357 455/422.1 |
| 2015/0282143 | A1* | 10/2015 | Kim | H04W 40/244 370/329 |
| 2015/0334550 | A1* | 11/2015 | Klatt | H04W 4/80 455/434 |
| 2016/0127858 | A1* | 5/2016 | Brockhaus | H04W 4/80 455/41.1 |
| 2016/0165559 | A1* | 6/2016 | Nagata | H04W 72/23 370/350 |
| 2016/0205678 | A1* | 7/2016 | Fujishiro | H04W 8/005 370/254 |
| 2016/0255569 | A1* | 9/2016 | Harada | H04W 72/044 455/434 |
| 2017/0142764 | A1* | 5/2017 | Yasukawa | H04W 56/001 |
| 2017/0188381 | A1* | 6/2017 | Lopes Batista | H04W 8/005 |
| 2017/0337394 | A1* | 11/2017 | Wang | H04L 67/51 |
| 2018/0027538 | A1* | 1/2018 | Uchiyama | H04W 72/20 370/329 |
| 2018/0103380 | A1* | 4/2018 | Ode | H04L 5/0053 |
| 2018/0124771 | A1* | 5/2018 | Mok | H04W 72/51 |
| 2018/0279275 | A1 | 9/2018 | Chen et al. | |
| 2019/0014444 | A1* | 1/2019 | Lei | H04W 4/027 |
| 2019/0053008 | A1* | 2/2019 | He | H04W 4/40 |
| 2019/0141678 | A1* | 5/2019 | Yang | H04W 72/04 |
| 2019/0182827 | A1* | 6/2019 | Wang | H04W 72/20 |
| 2019/0335532 | A1* | 10/2019 | Kim | H04W 76/00 |
| 2019/0394786 | A1* | 12/2019 | Parron | H04W 4/46 |
| 2020/0260240 | A1* | 8/2020 | Lee | H04W 4/02 |
| 2020/0314832 | A1* | 10/2020 | Baghel | H04W 88/04 |
| 2023/0276514 | A1* | 8/2023 | Basu Mallick | H04W 28/0284 370/328 |

FOREIGN PATENT DOCUMENTS

| | | |
|---|---|---|
| CN | 107925890 A | 4/2018 |
| CN | 108696896 A | 10/2018 |
| CN | 109068297 A | 12/2018 |
| CN | 109417685 A | 3/2019 |
| WO | 2017103662 A1 | 6/2017 |
| WO | 2018030306 A1 | 2/2018 |
| WO | 2018171460 A1 | 9/2018 |

OTHER PUBLICATIONS

Qualcomm Inc., "Discussion on Groupcast for NR V2X", 3GPP TSG-RAN WG2 Meeting #104, R2-1817780, Spokane, WA, US, Nov. 12-16, 2018, 6 pages.

Nokia et al., "Updates to Use of UE privacy setting and Location Service Exposure", 3GPP TSG-SA WG2 Meeting #131, S2-1902213 (revision of S2-1901647), Tenerife, Spain, Feb. 25-Mar. 1, 2019, 5 pages.

Huawei et al., "CR on intra-band contiguous MCC for V2X for TS 36.101", 3GPP TSG-RAN WG4 Meeting #82, R4-1702526, Athens, Greece, Feb. 13-17, 2017, 17 pages.

3GPP TS 22.186 V15.3.0 (Jun. 2018), 3rd Generation Partnership Project; Technical Specification Group Services and System Aspects; Enhancement of 3GPP support for V2X scenarios; Stage 1 (Release 15), 16 pages.

3GPP TS 22.186 V16.1.0 (Dec. 2018), 3rd Generation Partnership Project; Technical Specification Group Services and System Aspects; Enhancement of 3GPP support for V2X scenarios; Stage 1 (Release 16), 18 pages.

Nokia et al., "Updates to Use of UE privacy setting and Location Service Exposure", 3GPP TSG-SA WG2 Meeting #131, S2-1902286 (revision of S2-1902213), Tenerife, Spain, Feb. 25-Mar. 1, 2019, 5 pages.

Qualcomm Inc., "Physical layer procedures for HARQ operation for groupcast and unicast transmissions", 3GPP TSG RAN WG1 Meeting #95, R1-1813422, Spokane, WA, USA, Nov. 12-16, 2018, 6 pages.

3GPP TS 36.331 V15.5.1 (Apr. 2019), 3rd Generation Partnership Project; Technical Specification Group Radio Access Network; Evolved Universal Terrestrial Radio Access (E-UTRA); Radio Resource Control (RRC); Protocol specification (Release 15), 948 pages.

Qualcomm Inc et al., "Simplification of a Location Request from an External LCS Client or AF", SA WG2 Meeting #132 S2-1903409 (was S2-19xxxx), Xi'an, China, Apr. 8-12, 2019, 8 pages.

LG Electronics, "Feature lead summary #2 for agenda item 7.2.4.1.2 Physical layer procedures", 3GPP TSG RAN WG1 #96, R1-1903597, Athens, Greece, Feb. 25-Mar. 1, 2019, 26 pages.

3GPP TS 38.212 V15.5.0 (Mar. 2019), 3rd Generation Partnership Project; Technical Specification Group Radio Access Network; NR; Multiplexing and channel coding (Release 15), 101 pages.

3GPP TS 38.213 V15.5.0 (Mar. 2019), 3rd Generation Partnership Project; Technical Specification Group Radio Access Network; NR; Physical layer procedures for control (Release 15), 104 pages.

3GPP TS 38.214 V15.5.0 (Mar. 2019), 3rd Generation Partnership Project; Technical Specification Group Radio Access Network; NR; Physical layer procedures for data (Release 15), 103 pages.

3GPP TS 38.300 V15.5.0 (Mar. 2019), 3rd Generation Partnership Project; Technical Specification Group Radio Access Network; NR; NR and NG-RAN Overall Description; Stage 2 (Release 15), 98 pages.

3GPP TS 38.321 V15.5.0 (Mar. 2019), 3rd Generation Partnership Project; Technical Specification Group Radio Access Network; NR; Medium Access Control (MAC) protocol specification (Release 15), 78 pages.

3GPP TS 38.331 V15.5.1 (Apr. 2019), 3rd Generation Partnership Project; Technical Specification Group Radio Access Network; NR; Radio Resource Control (RRC) protocol specification (Release 15), 491 pages.

Qualcomm Inc., "Physical layer procedures for sidelink", 3GPP TSG RAN WG1 Meeting #96bis, R1-1905012, Xi'an, China, Apr. 8-12, 2019, 14 pages.

NTT Docomo, Inc., "NR Sidelink Physical Layer Procedure", 3GPP TSG RAN WG1 #96bis, R1-1905425, Xi'an, China, Apr. 8-12, 2019, 8 pages.

* cited by examiner

COMMUNICATIONS METHOD AND APPARATUS

CROSS-REFERENCE TO RELATED APPLICATIONS

This application is a continuation application of International Application No. PCT/CN2020/075135, filed on Feb. 13, 2020, which claims priority to Chinese Patent Application No. 201910346068.8, filed on Apr. 26, 2019. The disclosures of the aforementioned applications are hereby incorporated by reference in their entireties.

TECHNICAL FIELD

Embodiments of this application relate to the field of communications technologies, and in particular, to a communications method and apparatus.

BACKGROUND

Device-to-device (D2D) communication, vehicle-to-vehicle (V2V) communication, vehicle-to-pedestrian (V2P) communication, or vehicle-to-infrastructure/network (V2I/N) communication is a technology for direct communication between terminal devices. V2V, V2P, and V2I/N are collectively referred to as V2X (V2X), namely, vehicle-to-everything communication. In 5G new radio (NR) V2X, to meet a transmission reliability requirement, a distance between transceivers needs to be determined. In a conventional technology, a base station may send a positioning reference signal, to implement positioning between the base station and a terminal within a specific range (for example, within 100 meters) with precision.

If the method in the conventional technology is directly applied to the NR-V2X, because each transmitter and receiver in the NR-V2X may be in a high-speed moving state, mutual positioning between any two vehicles cannot be implemented with the conventional technology. Hence, according to the existing method, the receiver cannot accurately determine a mutual distance between any transmitter and the receiver on a sidelink.

SUMMARY

Embodiments of this application provide a communications method and apparatus, to accurately determine a distance between a receiver and a transmitter, and improve data transmission reliability.

To achieve the foregoing objective, the following technical solutions are used in the embodiments of this application.

A first aspect of the embodiments of this application provides a communication method. The method includes: A first device determines, based on a location of the first device and a quality of service parameter of first data, an identity of a first zone in which the first device is located, where the first data is data sent by the first device. The first device sends indication information, where the indication information includes first information, and the first information indicates the identity of the first zone. According to this solution, the identity of the first zone in which the first device is located is determined based on the quality of service parameter of the first data sent by the first device, so that the first zone in which the first device is located can be obtained through more proper division based on the quality of service parameter of the transmitted data, to improve precision of indicating a location corresponding to the identity of the first zone. Therefore, a distance that is between the first device and a second device and that is determined based on this division granularity is relatively accurate, thereby improving data transmission reliability, and improving an autonomous driving or advanced driver assistance systems (ADAS) capability of an electric vehicle.

With reference to the first aspect, in a possible implementation, the indication information includes second information, and the second information indicates the quality of service parameter of the first data. According to this solution, the quality of service parameter of the first data is sent, so that a receiver can learn of the division granularity at which a transmitter determines the first zone in which the transmitter is located.

With reference to the first aspect or the foregoing possible implementation, in another possible implementation, the quality of service parameter includes one or more of followings: priority information, latency information, reliability information, a data packet size, or a minimum communication distance. According to this solution, because quality of service parameters of different services may be different, the location of the first device may be obtained through division at different granularities by using information such as a priority, a latency, reliability, a data packet size, or a minimum communication distance of a data packet sent by the transmitter.

With reference to the first aspect or the foregoing possible implementations, in another possible implementation, the indication information includes the identity of the first zone, a priority of the first data, and the minimum communication distance of the first data. According to this solution, the transmitter may send, to the receiver, the identity of the first zone in which the transmitter is located, the priority of the first data sent by the transmitter, and the minimum communication distance between the transmitter and the receiver, so that the receiver can determine the location of the transmitter based on the indication information.

With reference to the first aspect or the foregoing possible implementations, in another possible implementation, the method further includes: The first device obtains configuration information, where the configuration information includes one or more groups of quality of service parameters and one or more zone parameters corresponding to each group of quality of service parameters, the zone parameter represents a size of a zone, and the one or more groups of quality of service parameters include the quality of service parameter of the first data. According to this solution, the first device may receive the configuration information that is sent by a network device or is preconfigured. When obtaining the location of the first device through division, the first device may determine the specific division granularity based on the configuration.

With reference to the first aspect or the foregoing possible implementations, in another possible implementation, the zone parameter includes a length of the zone, a width of the zone, a length and a width of the zone, or a radius of the zone. According to this solution, when obtaining the location of the first device through division at a relatively coarse granularity, the first device may perform the division into different shapes.

With reference to the first aspect or the foregoing possible implementations, in another possible implementation, that a first device determines, based on a location of the first device and a quality of service parameter of first data, an identity of a first zone in which the first device is located includes: The first device obtains, based on the quality of service parameter of the first data, a first zone parameter corresponding to the quality of service parameter of the first data, where the first zone parameter is one of one or more zone parameters corresponding to the quality of service parameter of the first data. The first device determines the identity of the first zone based on the first zone parameter and the location of the first device. According to this solution, the first device may obtain the location of the first device through division into zones based on the zone parameter corresponding to the quality of service parameter of the first data sent by the first device, to determine the identity of the first zone in which the first device is located.

With reference to the first aspect or the foregoing possible implementations, in another possible implementation, that the first device obtains, based on the quality of service parameter of the first data, a first zone parameter corresponding to the quality of service parameter of the first data includes: The first device determines the first zone parameter based on the quality of service parameter of the first data and a quantity of bits occupied by the identity of the first zone. For example, q bits in SCI indicate the identity of the first zone. The first zone parameter $L=Lm/2^{(q/2-1)}$ or $L=Lm*2^{-(q/2-1)}$, where Lm is the minimum communication distance. Alternatively, the first zone parameter $L=Lm/2^{(floor(q/2)-1)}$ or $L=Lm*2^{-(floor(q/2)-1)}$, where floor( ) represents rounding down to an integer. According to this solution, the first device may directly determine the first zone parameter based on the minimum communication distance of the first data sent by the first device. It may be understood that in this implementation, the first device may not determine the first zone parameter based on the obtained configuration information, but directly determine the first zone parameter based on the minimum communication distance of the first data.

With reference to the first aspect or the foregoing possible implementations, in another possible implementation, the configuration information further includes a plurality of resource pools, and each resource pool corresponds to one or more groups of quality of service parameters and/or one or more zone parameters. According to this solution, a quantity of bits of indication information can be further reduced, thereby reducing overheads.

With reference to the first aspect or the foregoing possible implementations, in another possible implementation, the configuration information is carried in a system information block SIB, radio resource control RRC signaling, or preconfigured signaling. According to this solution, the configuration information can be received by using the SIB, the RRC signaling, or the preconfigured signaling.

With reference to the first aspect or the foregoing possible implementations, in another possible implementation, the indication information further includes third information, and the third information indicates the first zone parameter corresponding to the quality of service parameter of the first data. According to this solution, when the quality of service parameter of the first data corresponds to a plurality of zone parameters, the first zone parameter corresponding to the quality of service parameter of the first data can be directly sent to the receiver.

With reference to the first aspect or the foregoing possible implementations, in another possible implementation, the first information indicates a part or all of the bits occupied by the identity of the first zone. According to this solution, because bits in the SCI are limited, all the bits of the identity of the first zone may be carried in the SCI, or the part of the bits of the identity of the first zone may be carried in the SCI. For example, when the identity of the first zone and the first information each are indicated by four bits in the SCI, the first information may indicate all the bits of the identity of the first zone. For another example, when the identity of the first zone is indicated by four bits in the SCI, and the first information is indicated by only two bits in the SCI, the first information may indicate two least significant bits of the identity of the first zone, and two most significant bits may be carried in a MAC message, an RRC message, or an application layer message.

With reference to the first aspect or the foregoing possible implementations, in another possible implementation, the identity of the first zone corresponds to a first resource pool, and the first resource pool is used by the first device to send the first data. According to this solution, the first device may send the first data based on the first resource pool corresponding to the identity of the first zone.

With reference to the first aspect or the foregoing possible implementations, in another possible implementation, the indication information further includes fourth information, the fourth information indicates an identity of a second zone, the identity of the second zone is an identity that is of the second zone in which the first device is located and that is determined by the first device based on the location of the first device and a second zone parameter, and the second zone parameter is different from the first zone parameter. According to this solution, the location of the first device may be obtained through division based on the second zone parameter, and the identity of the second zone in which the first device is located at this division granularity is sent to the receiver. Herein, that the first zone parameter is different from the second zone parameter indicates that the location of the first device may be obtained through division at different granularities. It should be noted that, when the division is performed at different granularities, coordinates of a reference origin should be the same. It may be understood that a range included in the second zone is larger than a range included in the first zone, and for example, may include the first zone and further include a zone other than the first zone. Alternatively, a range included in the first zone is larger than a range included in the second zone.

With reference to the first aspect or the foregoing possible implementations, in another possible implementation, the indication information further includes fifth information, and the fifth information indicates the location of the first device and/or speed information of the first device. According to this solution, the location of the first device and/or the speed information of the first device may be sent to the receiver, so that the receiver can obtain the location of the transmitter more accurately. It may be understood that both the first zone and the second zone may include the location of the first device and a location other than the location of the first device.

With reference to the first aspect or the foregoing possible implementations, in another possible implementation, the indication information further includes sixth information, and the sixth information indicates the second device to determine, based on signal quality and/or the distance between the first device and the second device, whether to send feedback information, where the second device is a device that receives the indication information. According to this solution, the first device may indicate the second device to determine, based on the signal quality and the distance between the first device and the second device, whether to send the feedback; or may indicate the second device to determine, based on the signal quality or the distance between the first device and the second device, whether to send the feedback. It may be understood that the distance between the first device and the second device is a distance between the transceivers.

With reference to the first aspect or the foregoing possible implementations, in another possible implementation, the indication information further includes seventh information, the seventh information indicates that a higher layer message includes one or more of followings: the identity of the first zone, the identity of the second zone, a part of all the bits used to carry the identity of the first zone, a part of all bits used to carry the identity of the second zone, the location of the first device, or the quality of service parameter, and the higher layer message includes the media access control MAC message, the RRC message, or the application layer message. According to this solution, the seventh information is sent, so that the receiver learns of information carried in the higher layer message, to reduce signaling overheads of the SCI.

With reference to the first aspect or the foregoing possible implementations, in another possible implementation, one or more of the first information, the second information, the third information, the fourth information, the fifth information, the sixth information, or the seventh information are carried in the sidelink control information SCI. According to this solution, one or more of the first information, the second information, the third information, the fourth information, the fifth information, the sixth information, or the seventh information may be carried in the SCI.

With reference to the first aspect or the foregoing possible implementations, in another possible implementation, a latency corresponding to the first data is less than or equal to a preconfigured or predefined first latency parameter. According to this solution, when the latency is relatively small, one or more of the first information, the second information, the third information, the fourth information, the fifth information, the sixth information, or the seventh information can be transmitted by using the SCI.

With reference to the first aspect or the foregoing possible implementations, in another possible implementation, one or more of the first information, the second information, the third information, the fourth information, or the fifth information are carried in the higher layer message, where the higher layer message includes the MAC message, the RRC message, or the application layer message. According to this solution, one or more of the first information, the second information, the third information, the fourth information, or the fifth information may be carried in the higher layer message, to reduce the signaling overheads of the SCI.

With reference to the first aspect or the foregoing possible implementations, in another possible implementation, a latency corresponding to the first data is greater than or equal to a preconfigured or predefined second latency parameter. According to this solution, when the latency is relatively large, one or more of the first information, the second information, the third information, the fourth information, or the fifth information can be transmitted by using the higher layer message.

With reference to the first aspect or the foregoing possible implementations, in another possible implementation, a part of bits of the first information, the second information, the third information, the fourth information, or the fifth information are carried in the SCI, and the other part of bits are carried in the MAC message, the RRC message, or the application layer message. According to this solution, the part of bits are carried in the SCI, and the other part of bits are carried in the higher layer message, to reduce the signaling overheads of the SCI.

A second aspect of the embodiments of this application provides a communication method. The method includes: A second device receives indication information and first data that are sent by a first device, where the indication information includes first information, the first information indicates an identity of a first zone, and the identity of the first zone is an identity that is of the first zone in which the first device is located and that is determined by the first device based on a location of the first device and a quality of service parameter of the first data. The second device determines a distance between the second device and the first device based on the indication information and a location of the second device. According to this solution, because the first zone in which the first device is located is obtained through division based on the quality of service parameter of the data transmitted by the first device, precision of indicating a location corresponding to the identity of the first zone is relatively high. Therefore, the distance that is between the first device and the second device and that is determined by the second device based on this division granularity is relatively accurate, thereby improving data transmission reliability, and improving an autonomous driving or advanced driver assistance systems ADAS capability of an electric vehicle.

With reference to the second aspect, in a possible implementation, the indication information includes second information, and the second information indicates the quality of service parameter of the first data. According to this solution, the second device may learn of, based on the quality of service parameter of the first data, the division granularity at which a transmitter determines the first zone in which the transmitter is located.

With reference to the second aspect or the foregoing possible implementation, in another possible implementation, the quality of service parameter includes one or more of followings: priority information, latency information, reliability information, a data packet size, or a minimum communication distance. According to this solution, because quality of service parameters of different services may be different, the second device may learn of the division granularity for the location of the first device based on information such as a priority, a latency, reliability, a data packet size, or a minimum communication distance of a data packet sent by the transmitter.

With reference to the second aspect or the foregoing possible implementations, in another possible implementation, the method further includes: The second device obtains configuration information, where the configuration information includes one or more groups of quality of service parameters and one or more zone parameters corresponding to each group of quality of service parameters, the zone parameter represents a size of a zone, and the one or more groups of quality of service parameters include the quality of service parameter of the first data. According to this solution, the second device may receive the configuration information that is sent by a network device or is preconfigured, to learn of a correspondence between a quality of service parameter and a zone parameter.

With reference to the second aspect or the foregoing possible implementations, in another possible implementation, the zone parameter includes a length of the zone, a width of the zone, a length and a width of the zone, or a radius of the zone. According to this solution, the first device may obtain the location of the first device through division into different shapes.

With reference to the second aspect or the foregoing possible implementations, in another possible implementation, the configuration information further includes a plurality of resource pools, and each resource pool corresponds to one or more groups of quality of service parameters and/or one or more zone parameters. According to this solution, a quantity of bits of indication information can be further reduced, thereby reducing overheads.

With reference to the second aspect or the foregoing possible implementations, in another possible implementation, the configuration information is carried in a system information block SIB, radio resource control RRC signaling, or preconfigured signaling. According to this solution, the configuration information can be received by using the SIB, the RRC signaling, or the preconfigured signaling.

With reference to the second aspect or the foregoing possible implementations, in another possible implementation, the indication information further includes third information, and the third information indicates a first zone parameter corresponding to the quality of service parameter of the first data. According to this solution, the second device can learn of the division granularity at which the first device obtains, through division, the first zone in which the first device is located.

With reference to the second aspect or the foregoing possible implementations, in another possible implementation, the first information indicates a part or all of bits occupied by the identity of the first zone. According to this solution, because bits in SCI are limited, all the bits occupied by the identity of the first zone may be carried in the SCI, or the part of the bits occupied by the identity of the first zone may be carried in the SCI.

With reference to the second aspect or the foregoing possible implementations, in another possible implementation, the identity of the first zone corresponds to a first resource pool, and the first resource pool is used by the first device to send the first data. According to this solution, the first device may send the first data based on the first resource pool corresponding to the identity of the first zone.

With reference to the second aspect or the foregoing possible implementations, in another possible implementation, the indication information further includes fourth information, the fourth information indicates an identity of a second zone, the identity of the second zone is an identity that is of the second zone in which the first device is located and that is determined by the first device based on the location of the first device and a second zone parameter, and the second zone parameter is different from the first zone parameter. According to this solution, the second device may learn of the identity obtained when the location of the first device is obtained through division at another division granularity.

With reference to the second aspect or the foregoing possible implementations, in another possible implementation, that the second device determines a distance between the second device and the first device based on the indication information and a location of the second device includes: The second device determines the distance between the second device and the first device based on the identity of the first zone, the identity of the second zone, and the location of the second device. According to this solution, the second device may further determine a specific location of the first device based on different division granularities, to remove ambiguity of the identity of the first zone, so that a determined distance between transceivers is more accurate.

With reference to the second aspect or the foregoing possible implementations, in another possible implementation, the indication information further includes fifth information, and the fifth information indicates the location of the first device and/or speed information of the first device. According to this solution, the second device may learn of the location and the speed information of the first device.

With reference to the second aspect or the foregoing possible implementations, in another possible implementation, that the second device determines a distance between the second device and the first device based on the indication information and a location of the second device includes: determining the distance between the second device and the first device based on the identity of the first zone, the fifth information, and the location of the second device. According to this solution, the second device may further determine a more accurate location of the first device based on the location and/or the speed information of the first device, to remove ambiguity of the identity of the first zone, so that a calculated distance between transceivers is more accurate.

With reference to the second aspect or the foregoing possible implementations, in another possible implementation, that the second device determines a distance between the second device and the first device based on the indication information and a location of the second device includes: The second device obtains signal quality of the first data, and determines the distance between the second device and the first device based on the identity of the first zone, the signal quality of the first data, and the location of the second device. According to this solution, the second device may remove ambiguity of the identity of the first zone based on the signal quality of the first data, so that a calculated distance between transceivers is more accurate.

With reference to the second aspect or the foregoing possible implementations, in another possible implementation, the signal quality includes any one or more of a reference signal received power RSRP, reference signal received quality RSRQ, a received signal strength indicator RSSI, or a signal to interference plus noise ratio SINR. According to this solution, the signal quality may be one or more of the RSRP, the RSRQ, the RSSI, and the SINR.

With reference to the second aspect or the foregoing possible implementations, in another possible implementation, the indication information further includes sixth information, and the sixth information indicates the second device to determine, based on the signal quality and/or the distance between the first device and the second device, whether to send feedback information. According to this solution, the first device may indicate the second device to determine, based on the signal quality and the distance between the transceivers, whether to send the feedback; or may indicate the second device to determine, based on the signal quality or the distance between the transceivers, whether to send the feedback.

With reference to the second aspect or the foregoing possible implementations, in another possible implementation, the method further includes: If the distance between the second device and the first device is less than or equal to the minimum communication distance, and the signal quality of the first data is greater than or equal to a first preset threshold, the second device sends hybrid automatic repeat request HARQ feedback information to the first device. According to this solution, the second device may send the HARQ feedback based on the distance between the transceivers and the signal quality of the first data.

With reference to the second aspect or the foregoing possible implementations, in another possible implementation, the method further includes: If the distance between the second device and the first device is less than or equal to the minimum communication distance, the second device sends HARQ feedback information to the first device. According to this solution, a receiver may send the HARQ feedback based on the distance between the transceivers.

With reference to the second aspect or the foregoing possible implementations, in another possible implementation, the method further includes: If the distance between the second device and the first device is greater than or equal to the minimum communication distance, and the signal quality of the first data is greater than or equal to a second preset threshold, the second device sends HARQ feedback information to the first device. The second preset threshold may be the same as or different from the first preset threshold. According to this solution, a receiver may send the HARQ feedback based on the distance between the transceivers and the signal quality of the first data.

With reference to the second aspect or the foregoing possible implementations, in another possible implementation, the method further includes: The second device determines a subset of distances between the second device and the first device based on the location of the second device and the identity of the first zone in which the first device is located. If the minimum communication distance belongs to the subset of distances, and the signal quality of the first data is greater than or equal to a preset threshold, the second device sends HARQ feedback information to the first device. It may be understood that, because the location of the first device is indicated at a relatively coarse granularity by using the identity of the first zone in which the first device is located, when calculating the distance between the second device and the first device, the second device may calculate a minimum distance and a maximum distance between the second device and two edges of the first zone. The subset of distances is a set of values that are greater than or equal to the minimum distance and less than or equal to the maximum distance. According to this solution, when the minimum communication distance between the transceivers belongs to the subset of distances between the transceivers, whether to send the HARQ feedback may be further determined based on the signal quality.

With reference to the second aspect or the foregoing possible implementations, in another possible implementation, the HARQ feedback information is an explicit field on a feedback channel sent by the second device, or the HARQ feedback information is implicitly indicated by a transmission resource occupied by a feedback channel sent by the second device. According to this solution, the feedback may be sent by using the field on the feedback channel, or the feedback information may be implicitly indicated by using the transmission resource occupied by the feedback channel.

With reference to the second aspect or the foregoing possible implementations, in another possible implementation, the transmission resource occupied by the feedback channel includes at least one of a time domain resource, a frequency domain resource, and a code sequence parameter. According to this solution, the feedback information may be indicated by using the time domain resource, the frequency domain resource, or the code sequence parameter.

With reference to the second aspect or the foregoing possible implementations, in another possible implementation, the indication information is carried on a physical sidelink control channel PSCCH, and/or the first data is carried on a physical sidelink shared channel PSSCH, and/or the HARQ feedback information is carried on a physical sidelink feedback channel PSFCH. According to this solution, the indication information may be sent on the PSCCH, the first data may be sent on the PSSCH, and the feedback information may be sent on the PSFCH.

With reference to the second aspect or the foregoing possible implementations, in another possible implementation, the indication information further includes seventh information, the seventh information indicates that a higher layer message includes one or more of the followings: identity of the first zone, the identity of the second zone, a part of all the bits used to carry the identity of the first zone, a part of all bits used to carry the identity of the second zone, the location of the first device, or the quality of service parameter, and the higher layer message includes a media access control MAC message, an RRC message, or an application layer message. According to this solution, the receiver may learn of, based on the seventh information in the SCI, information carried in the higher layer message, to reduce signaling overheads of the SCI.

With reference to the second aspect or the foregoing possible implementations, in another possible implementation, one or more of the first information, the second information, the third information, the fourth information, the fifth information, the sixth information, or the seventh information are carried in the sidelink control information SCI. According to this solution, one or more of the first information, the second information, the third information, the fourth information, the fifth information, the sixth information, or the seventh information may be carried in the SCI.

With reference to the second aspect or the foregoing possible implementations, in another possible implementation, a latency corresponding to the first data is less than or equal to a preconfigured or predefined first latency parameter. According to this solution, when the latency is relatively small, one or more of the first information, the second information, the third information, the fourth information, the fifth information, the sixth information, or the seventh information can be transmitted by using the SCI.

With reference to the second aspect or the foregoing possible implementations, in another possible implementation, one or more of the first information, the second information, the third information, the fourth information, or the fifth information are carried in the higher layer message, where the higher layer message includes the MAC message, the RRC message, or the application layer message. According to this solution, one or more of the first information, the second information, the third information, the fourth information, or the fifth information may be carried in the higher layer message, to reduce the signaling overheads of the SCI.

With reference to the second aspect or the foregoing possible implementations, in another possible implementation, a latency corresponding to the first data is greater than or equal to a preconfigured or predefined second latency parameter. According to this solution, when the latency is relatively large, one or more of the first information, the second information, the third information, the fourth information, or the fifth information can be transmitted by using the higher layer message.

With reference to the second aspect or the foregoing possible implementations, in another possible implementation, a part of bits of the first information, the second information, the third information, the fourth information, or the fifth information are carried in the SCI, and the other part of bits are carried in the MAC message, the RRC message, or the application layer message. According to this solution, the part of bits are carried in the SCI, and the other part of bits are carried in the higher layer message, to reduce the signaling overheads of the SCI.

A third aspect of the embodiments of this application provides a communications apparatus. The communications apparatus includes a processing unit and a communications unit. The processing unit is configured to determine, based on a location of the communications apparatus and a quality of service parameter of first data, an identity of a first zone in which the communications apparatus is located, where the first data is data sent by the communications apparatus. The communications unit is configured to indication information, where the indication information includes first information, and the first information indicates the identity of the first zone.

With reference to the third aspect, in a possible implementation, the indication information includes second information, and the second information indicates the quality of service parameter of the first data.

With reference to the third aspect or the foregoing possible implementation, in another possible implementation, the quality of service parameter includes one or more of followings: priority information, latency information, reliability information, a data packet size, or a minimum communication distance.

With reference to the third aspect or the foregoing possible implementations, in another possible implementation, the indication information includes the identity of the first zone, a priority of the first data, and the minimum communication distance of the first data.

With reference to the third aspect or the foregoing possible implementations, in another possible implementation, the processing unit is further configured to obtain configuration information, where the configuration information includes one or more groups of quality of service parameters and one or more zone parameters corresponding to each group of quality of service parameters, the zone parameter represents a size of a zone, and the one or more groups of quality of service parameters include the quality of service parameter of the first data.

With reference to the third aspect or the foregoing possible implementations, in another possible implementation, the zone parameter includes a length of the zone, a width of the zone, a length and a width of the zone, or a radius of the zone.

With reference to the third aspect or the foregoing possible implementations, in another possible implementation, the processing unit is further configured to obtain, based on the quality of service parameter of the first data, a first zone parameter corresponding to the quality of service parameter of the first data, where the first zone parameter is one of one or more zone parameters corresponding to the quality of service parameter of the first data; and determine the identity of the first zone based on the first zone parameter and the location of the communications apparatus.

With reference to the third aspect or the foregoing possible implementations, in another possible implementation, the processing unit is specifically configured to determine the first zone parameter based on the quality of service parameter of the first data and a quantity of bits occupied by the identity of the first zone.

With reference to the third aspect or the foregoing possible implementations, in another possible implementation, the configuration information further includes a plurality of resource pools, and each resource pool corresponds to one or more groups of quality of service parameters and/or one or more zone parameters.

With reference to the third aspect or the foregoing possible implementations, in another possible implementation, the configuration information is carried in a system information block SIB, radio resource control RRC signaling, or preconfigured signaling.

With reference to the third aspect or the foregoing possible implementations, in another possible implementation, the indication information further includes third information, and the third information indicates the first zone parameter corresponding to the quality of service parameter of the first data.

With reference to the third aspect or the foregoing possible implementations, in another possible implementation, the first information indicates a part or all of the bits occupied by the identity of the first zone.

With reference to the third aspect or the foregoing possible implementations, in another possible implementation, the identity of the first zone corresponds to a first resource pool, and the first resource pool is used by the communications apparatus to send the first data.

With reference to the third aspect or the foregoing possible implementations, in another possible implementation, the indication information further includes fourth information, the fourth information indicates an identity of a second zone, the identity of the second zone is an identity that is of the second zone in which the communications apparatus is located and that is determined by the communications apparatus based on the location of the communications apparatus and a second zone parameter, and the second zone parameter is different from the first zone parameter.

With reference to the third aspect or the foregoing possible implementations, in another possible implementation, the indication information further includes fifth information, or the fifth information indicates the location of the communications apparatus and/or speed information of the communications apparatus.

With reference to the third aspect or the foregoing possible implementations, in another possible implementation, the indication information further includes sixth information, and the sixth information indicates a second device to determine, based on signal quality and/or a distance between the communications apparatus and the second device, whether to send feedback information, where the second device is a device that receives the indication information.

With reference to the third aspect or the foregoing possible implementations, in another possible implementation, the indication information further includes seventh information, or the seventh information indicates that a higher layer message includes one or more of followings: the identity of the first zone, the location of the communications apparatus, or the quality of service parameter. The higher layer message includes a media access control MAC message, an RRC message, or an application layer message.

With reference to the third aspect or the foregoing possible implementations, in another possible implementation, one or more of the first information, the second information, the third information, the fourth information, the fifth information, the sixth information, or the seventh information are carried in sidelink control information SCI.

With reference to the third aspect or the foregoing possible implementations, in another possible implementation, a latency corresponding to the first data is less than or equal to a preconfigured or predefined first latency parameter.

With reference to the third aspect or the foregoing possible implementations, in another possible implementation, one or more of the first information, the second information, the third information, the fourth information, or the fifth information are carried in the higher layer message, where the higher layer message includes a MAC message, an RRC message, or an application layer message.

With reference to the third aspect or the foregoing possible implementations, in another possible implementation, a latency corresponding to the first data is greater than or equal to a preconfigured or predefined second latency parameter.

With reference to the third aspect or the foregoing possible implementations, in another possible implementation, a part of bits of the first information, the second information, the third information, the fourth information, or the fifth information are carried in the SCI, and the other part of bits are carried in the MAC message, the RRC message, or the application layer message.

A fourth aspect of the embodiments of this application provides a communications apparatus. The communications apparatus includes a processing unit and a communications unit. The communications unit is configured to receive indication information and first data that are sent by a first device, where the indication information includes first information, the first information indicates an identity of a first zone, and the identity of the first zone is an identity that is of the first zone in which the first device is located and that is determined by the first device based on a location of the first device and a quality of service parameter of the first data. The communications unit is configured to determine a distance between the communications apparatus and the first device based on the indication information and a location of the communications apparatus.

With reference to the fourth aspect, in a possible implementation, the indication information includes second information, and the second information indicates the quality of service parameter of the first data.

With reference to the fourth aspect or the foregoing possible implementation, in another possible implementation, the quality of service parameter includes one or more of followings: priority information, latency information, reliability information, a data packet size, or a minimum communication distance.

With reference to the fourth aspect or the foregoing possible implementations, in another possible implementation, the processing unit is further configured to obtain configuration information, where the configuration information includes one or more groups of quality of service parameters and one or more zone parameters corresponding to each group of quality of service parameters, the zone parameter represents a size of a zone, and the one or more groups of quality of service parameters include the quality of service parameter of the first data.

With reference to the fourth aspect or the foregoing possible implementations, in another possible implementation, the zone parameter includes a length of the zone, a width of the zone, a length and a width of the zone, or a radius of the zone.

With reference to the fourth aspect or the foregoing possible implementations, in another possible implementation, the configuration information further includes a plurality of resource pools, and each resource pool corresponds to one or more groups of quality of service parameters and/or one or more zone parameters.

With reference to the fourth aspect or the foregoing possible implementations, in another possible implementation, the configuration information is carried in a system information block SIB, radio resource control RRC signaling, or preconfigured signaling.

With reference to the fourth aspect or the foregoing possible implementations, in another possible implementation, the indication information further includes third information, and the third information indicates a first zone parameter corresponding to the quality of service parameter of the first data.

With reference to the fourth aspect or the foregoing possible implementations, in another possible implementation, the first information indicates a part or all of bits occupied by the identity of the first zone.

With reference to the fourth aspect or the foregoing possible implementations, in another possible implementation, the identity of the first zone corresponds to a first resource pool, and the first resource pool is used by the first device to send the first data.

With reference to the fourth aspect or the foregoing possible implementations, in another possible implementation, the indication information further includes fourth information, the fourth information indicates an identity of a second zone, the identity of the second zone is an identity that is of the second zone in which the first device is located and that is determined by the first device based on the location of the first device and a second zone parameter, and the second zone parameter is different from the first zone parameter.

With reference to the fourth aspect or the foregoing possible implementations, in another possible implementation, the communications unit is specifically configured to determine the distance between the communications apparatus and the first device based on the identity of the first zone, the identity of the second zone, and the location of the communications apparatus.

With reference to the fourth aspect or the foregoing possible implementations, in another possible implementation, the indication information further includes fifth information, and the fifth information indicates the location of the first device and/or speed information of the first device.

With reference to the fourth aspect or the foregoing possible implementations, in another possible implementation, the communications unit is specifically configured to determine the distance between the communications apparatus and the first device based on the identity of the first zone, the fifth information, and the location of the communications apparatus.

With reference to the fourth aspect or the foregoing possible implementations, in another possible implementation, the communications unit is specifically configured to: obtain signal quality of the first data; and determine the distance between the communications apparatus and the first device based on the identity of the first zone, the signal quality of the first data, and the location of the communications apparatus.

With reference to the fourth aspect or the foregoing possible implementations, in another possible implementation, the signal quality includes any one or more of a reference signal received power (RSRP), reference signal received quality (RSRQ), a received signal strength indicator (RSSI), or a signal to interference plus noise ratio (SINR).

With reference to the fourth aspect or the foregoing possible implementations, in another possible implementation, the indication information further includes sixth information, and the sixth information indicates the communications apparatus to determine, based on the signal quality and/or the distance between the first device and the communications apparatus, whether to send feedback information.

With reference to the fourth aspect or the foregoing possible implementations, in another possible implementation, if the processing unit determines that the distance between the communications apparatus and the first device is less than or equal to the minimum communication distance, and the signal quality of the first data is greater than or equal to a first preset threshold, the communications unit is further configured to send hybrid automatic repeat request HARQ feedback information to the first device.

With reference to the fourth aspect or the foregoing possible implementations, in another possible implementation, if the processing unit determines that the distance between the communications apparatus and the first device is less than or equal to the minimum communication distance, the communications unit is further configured to send HARQ feedback information to the first device.

With reference to the fourth aspect or the foregoing possible implementations, in another possible implementation, the processing unit is further configured to determine a subset of distances between the communications apparatus and the first device based on the location of the communications apparatus and the identity of the first zone in which the first device is located. If the processing unit determines that the minimum communication distance belongs to the subset of distances, and the signal quality of the first data is greater than or equal to a preset threshold, the communications unit is further configured to send HARQ feedback information to the first device.

With reference to the fourth aspect or the foregoing possible implementations, in another possible implementation, the HARQ feedback information is an explicit field on a feedback channel sent by the communications apparatus, or the HARQ feedback information is implicitly indicated by a transmission resource occupied by a feedback channel sent by the communications apparatus.

With reference to the fourth aspect or the foregoing possible implementations, in another possible implementation, the transmission resource occupied by the feedback channel includes at least one of a time domain resource, a frequency domain resource, and a code sequence parameter.

With reference to the fourth aspect or the foregoing possible implementations, in another possible implementation, the indication information is carried on a physical sidelink control channel PSCCH, and/or the first data is carried on a physical sidelink shared channel PSSCH, and/or the HARQ feedback information is carried on a physical sidelink feedback channel PSFCH.

With reference to the fourth aspect or the foregoing possible implementations, in another possible implementation, the indication information further includes seventh information, or the seventh information indicates that a higher layer message includes one or more of followings: the identity of the first zone, the location of the first device, or the quality of service parameter. The higher layer message includes a media access control MAC message, an RRC message, or an application layer message.

With reference to the fourth aspect or the foregoing possible implementations, in another possible implementation, one or more of the first information, the second information, the third information, the fourth information, the fifth information, the sixth information, or the seventh information are carried in sidelink control information SCI.

With reference to the fourth aspect or the foregoing possible implementations, in another possible implementation, a latency corresponding to the first data is less than or equal to a preconfigured or predefined first latency parameter.

With reference to the fourth aspect or the foregoing possible implementations, in another possible implementation, one or more of the first information, the second information, the third information, the fourth information, and the fifth information are carried in the higher layer message, where the higher layer message includes the MAC message, the RRC message, or the application layer message.

With reference to the fourth aspect or the foregoing possible implementations, in another possible implementation, a latency corresponding to the first data is greater than or equal to a preconfigured or predefined second latency parameter.

With reference to the fourth aspect or the foregoing possible implementations, in another possible implementation, a part of bits of the first information, the second information, the third information, the fourth information, and the fifth information are carried in the SCI, and the other part of bits are carried in the MAC message, the RRC message, or the application layer message.

For effect descriptions of the third aspect and various implementations of the third aspect, refer to the corresponding effect descriptions of the first aspect and various implementations of the first aspect. For effect descriptions of the fourth aspect and various implementations of the fourth aspect, refer to the corresponding effect descriptions of the second aspect and various implementations of the second aspect. Details are not described herein again.

A fifth aspect of the embodiments of this application provides a computer storage medium. The computer storage medium stores computer program code. When the computer program code is run on a processor, the processor is enabled to perform the communication method according to any one of the foregoing aspects.

A sixth aspect of the embodiments of this application provides a computer program product. The program product stores computer software instructions executed by the foregoing processor. The computer software instructions include a program used to perform the solutions in the foregoing aspects.

A seventh aspect of the embodiments of this application provides a communications apparatus. The apparatus includes a transceiver, a processor, and a memory. The transceiver is configured to send and receive information, or is configured to communicate with another network element. The memory is configured to store computer-executable instructions. The processor is configured to execute the computer-executable instructions to implement the communication method according to any one of the foregoing aspects.

An eighth aspect of the embodiments of this application provides a communications apparatus. The apparatus exists in a product form of a chip. A structure of the apparatus includes a processor, and may further include a memory. The memory is configured to: be coupled to the processor, and store program instructions and data that are necessary for the apparatus. The processor is configured to execute the program instructions stored in the memory, to enable the apparatus to perform the method according to any one of the foregoing aspects.

A ninth aspect of the embodiments of this application provides a communications apparatus. The apparatus exists in a product form of a chip. A structure of the apparatus includes a processor and an interface circuit. The processor is configured to communicate with another apparatus through an interface circuit, to enable the apparatus to perform the method according to any one of the foregoing aspects.

A tenth aspect of the embodiments of this application provides a terminal device. The terminal device includes the apparatus according to each of the foregoing aspects and the related implementations.

An eleventh aspect of the embodiments of this application provides a system. The system includes the apparatus according to the third aspect and the related implementations and the apparatus according to the fourth aspect and the related implementations.

DETAILED DESCRIPTION OF ILLUSTRATIVE EMBODIMENTS

The following describes technical solutions in embodiments of this application with reference to the accompanying drawings in the embodiments of this application. In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between associated objects. The term "at least one item (piece) of the following" or a similar expression thereof refers to any combination of these items, and includes a single item (piece) or any combination of a plurality of items (pieces). For example, at least one (piece) of a, b, or c may represent: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence. For example, "first" in a first device and "second" in a second device in the embodiments of this application are merely used to distinguish between different devices.

It should be noted that, in this application, the word such as "example" or "for example" represents giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

Figure 1:
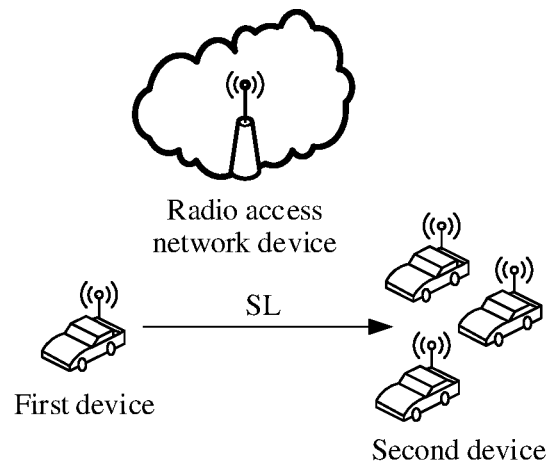
FIG. 1 is a schematic diagram of a V2X communication scenario according to an embodiment of this application.

The embodiments of this application provide a communication method, and the communication method is applied to a V2X communication scenario shown in FIG. 1. As shown in FIG. 1, a first device and a second device communicate with each other over a sidelink (SL). The sidelink is a secondary link in a V2X network. The V2X network further includes an uplink and a downlink in addition to the secondary link.

For example, V2X communication includes vehicle-to-vehicle (V2V) communication, vehicle-to-infrastructure (V2I) communication, vehicle-to-pedestrian (V2P) communication, and vehicle-to-application server (V2N) communication. V2V communication between the first device and the second device that are both vehicles is merely used as an example in FIG. 1. A specific V2X communication scenario is not limited in the embodiments of this application. For example, communication between the first device and the second device may be communication between vehicle-mounted devices, communication between a road side unit (RSU) and a vehicle-mounted device and/or a network device (for example, a base station device), communication between a network device (for example, a base station device) and a vehicle-mounted device and/or an RSU, or the like. The network device may be an LTE base station device, an NR base station device, or a base station in a subsequent evolved system. It may be understood that specific forms of the first device and the second device are not limited in the embodiments of this application, and the descriptions herein are merely examples. For example, a radio access network device in FIG. 1 may be a base station, or a device that is in the network and that provides radio access.

It may be understood that the communication method provided in this application is not only applicable to the sidelink shown in FIG. 1, but also applicable to a cellular link. A scenario to which the communication method is applicable is not limited in the embodiments of this application, and the descriptions herein are merely examples. The first device and the second device in the embodiments of this application are communications devices, and the communications device may be a terminal device, or may be a network device. When the first device is a network device, the sidelink may be a link between base stations, for example, a link between macro base stations, a link between a macro base station and a small cell, a link between a master base station and a secondary base station, a link between master base stations, or a link between secondary base stations. This is not limited in the embodiments of this application.

Figure 2:
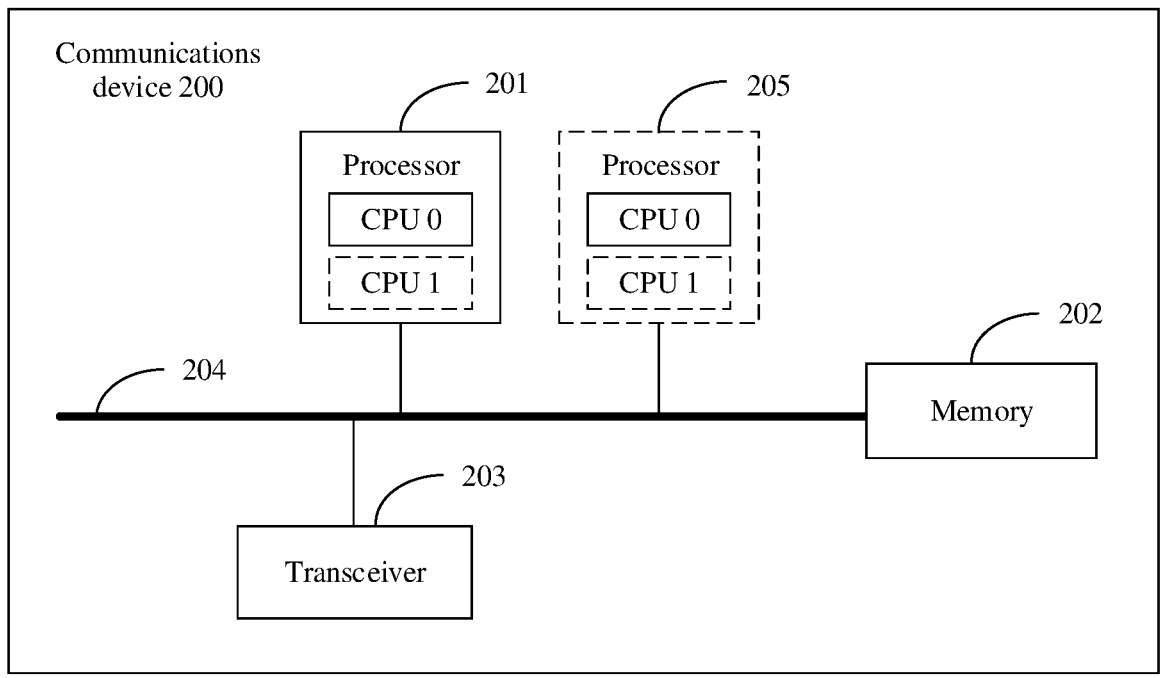
FIG. 2 is a schematic structural diagram of a communications device according to an embodiment of this application.

FIG. 2 shows a communications device 200 according to an embodiment of this application. The communications device 200 may be the first device or the second device in this application. The communications device 200 may be a vehicle, or may be an in-vehicle communications apparatus or a vehicle-mounted terminal that is mounted on a vehicle and that is configured to assist the vehicle in driving, or may be a chip that is in an in-vehicle communications apparatus or a vehicle-mounted terminal. The vehicle-mounted terminal may be a device configured to implement a wireless communication function, for example, a terminal or a chip that can be used in a terminal. The terminal may be user equipment (UE), an access terminal, a terminal unit, a terminal station, a mobile station, a remote station, a remote terminal, a mobile device, a wireless communications device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device or a wearable device, a virtual reality (VR) terminal device, an augmented reality (AR) terminal device, a wireless terminal in industrial control, a wireless terminal in self driving, a wireless terminal in remote medical treatment, a wireless terminal in a smart grid, a wireless terminal in transportation safety, a wireless terminal in a smart city, a wireless terminal in a smart home, or the like. The vehicle-mounted terminal may be movable or fixed.

As shown in FIG. 2, the communications device 200 includes at least one processor 201, a memory 202, a transceiver 203, and a communications bus 204.

The following specifically describes the components of the communications device with reference to FIG. 2.

The processor 201 is a control center of the communications device, and may be one processor or may be a general name of a plurality of processing elements. For example, the processor 201 is a central processing unit (CPU), or an application-specific integrated circuit (ASIC), or is configured as one or more integrated circuits for implementing the embodiments of the present invention, for example, one or more microprocessors (DSP) or one or more field programmable gate arrays (FPGA).

The processor 201 may perform various functions of the communications device by running or executing a software program stored in the memory 202 and invoking data stored in the memory 202.

During specific implementation, in an embodiment, the processor 201 may include one or more CPUs, for example, a CPU 0 and a CPU 1 shown in FIG. 2.

During specific implementation, in an embodiment, the communications device may include a plurality of processors, for example, the processor 201 and a processor 205 shown in FIG. 2. Each of the processors may be a single-core processor (single-CPU) or may be a multi-core processor (multi-CPU). The processor herein may be one or more communications devices, circuits, and/or processing cores configured to process data (for example, computer program instructions).

The memory 202 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage medium, an optical disc storage medium (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory 202 may exist independently and be connected to the processor 201 via the communications bus 204. Alternatively, the memory 202 may be integrated with the processor 201.

The memory 202 is configured to store a software program for executing the solutions of the present invention, and the processor 201 controls execution.

The transceiver 203 is configured to communicate with another communications device. Certainly, the transceiver 203 may be further configured to communicate with a communications network, such as the Ethernet, a radio access network (RAN), or a wireless local area network (WLAN). The transceiver 203 may include a receiving unit for implementing a receiving function and a sending unit for implementing a sending function.

The communications bus 204 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line represents the bus in FIG. 2, but this does not mean that there is only one bus or only one type of bus.

The structure that is of the communications device and that is shown in FIG. 2 does not constitute a limitation on the communications device. The communications device may include more or fewer components than those shown in the figure, or some components may be combined, or the communications device may have different component arrangement.

To ensure performance requirements on reliability, a latency, and a transmission rate of data transmission in an NR-V2X network, it needs to be determined that a distance between transceivers falls within a minimum communication distance range. To meet the foregoing performance requirements, the distance between the transceivers needs to be determined. An amount of data required for directly sending coordinates of a location of a transmitter on a sidelink is excessively large. Therefore, the coordinates of the location of the transmitter may be quantized, and the location of the transmitter (the first device in the embodiments of this application) is indicated at a relatively coarse granularity, so that a receiver (the second device in the embodiments of this application) can determine the distance between the transceivers. In an existing LTE protocol, ZoneID is calculated in a unit of meters, and then a transmission resource on the sidelink is determined by using ZoneID. However, in the existing location indication method, when the location is obtained through division at a relatively coarse granularity, the division is mainly performed based on a geographical zone, to implement frequency reuse. For example, because a moving speed of a vehicle on a highway is relatively high, a location of the vehicle driving on the highway may be obtained through division at a granularity of 500 meters. However, a feature of a transmission service is not considered in this division method. Consequently, when a minimum communication distance between transceivers is relatively short (for example, is 50 meters), a receiver cannot accurately learn of a distance between the receiver and the transmitter based on the division granularity.

To resolve a problem, in a conventional technology, that the receiver cannot accurately determine the distance between the receiver and the transmitter, the embodiments of this application provide a communication method, to accurately determine the distance between the receiver and the transmitter, and improve the data transmission reliability.

Figure 3:
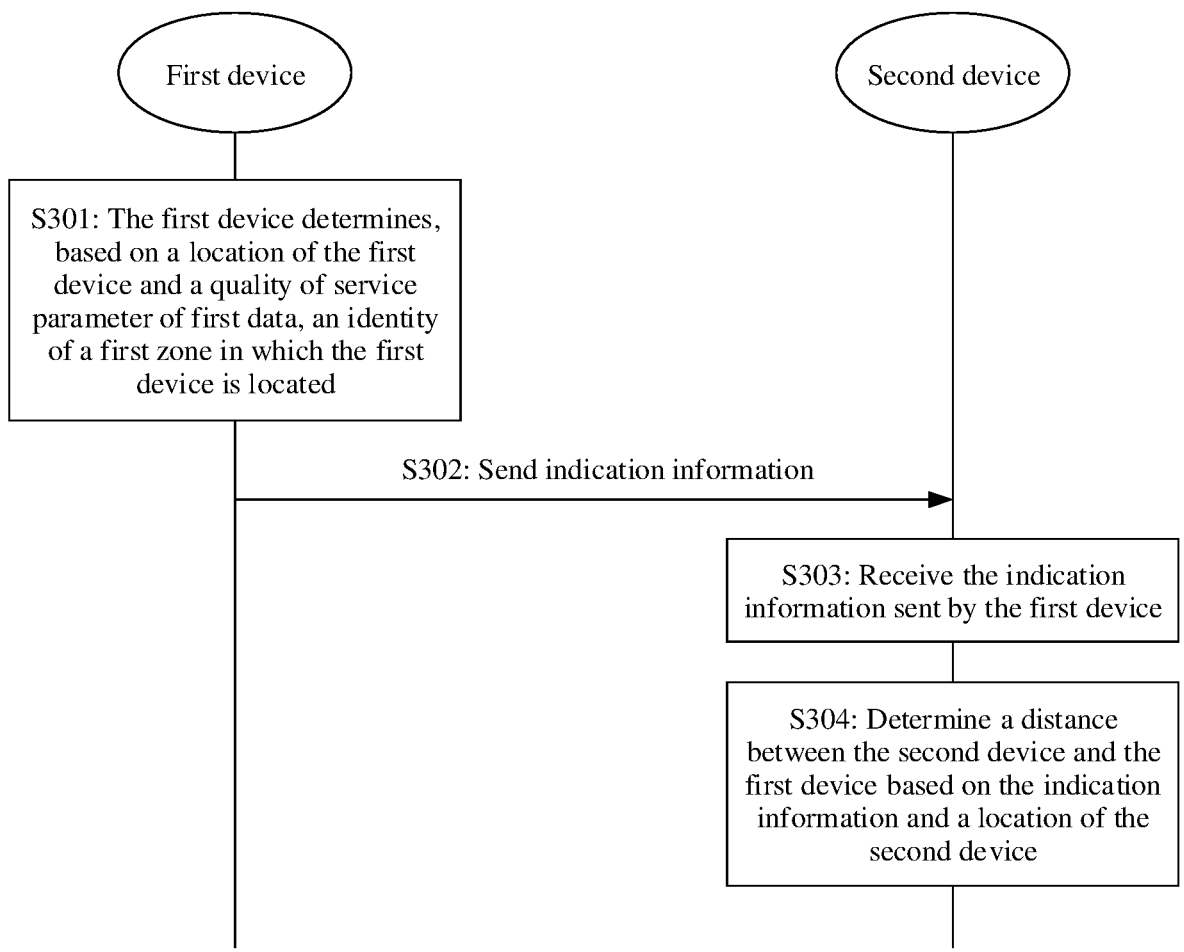
FIG. 3 is a schematic flowchart of a communication method according to an embodiment of this application.

FIG. 3 shows a communication method according to an embodiment of this application. The communication method includes steps S301 to S304.

S301: A first device determines, based on a location of the first device and a quality of service parameter of first data, an identity of a first zone in which the first device is located.

The first data is data sent by the first device, and the first device is a transmitter when sending the first data. For example, the first device may send the first data in a groupcast, unicast, or broadcast manner. For example, the first device may send the first data to one second device, or may send the first data to a plurality of second devices. Optionally, when the first device sends the first data to a plurality of second devices, the second device may be a receiver that the first device knows, or may be a receiver that the first device does not know. This is not limited in the present invention.

For example, the location of the first device is a geographical location of the first device. The geographical location of the first device may be location coordinates obtained by a satellite, for example, may be global positioning system (GPS) coordinates or BeiDou location coordinates. Alternatively, the location of the first device may be location information obtained by another positioning system or positioning technology, for example, location information obtained based on inertial navigation, location information obtained based on radar, or location information obtained based on a positioning signal between a network device and UE. This is not limited in this embodiment of this application.

For example, the quality of service (QoS) parameter includes one or more sub-parameters, for example, one or more of following sub-parameters: a sub-parameter 1: priority information, a sub-parameter 2: latency information, a sub-parameter 3: reliability information, a sub-parameter 4: a data packet size, or a sub-parameter 5: a minimum communication distance.

Optionally, the priority information indicates or determine a priority of a data packet, and a higher priority indicates that a data packet corresponding to the priority is more important or more urgent.

Optionally, the latency information is a maximum latency required during transmission of the data packet. Optionally, for example, some data packets are required to arrive at a receiver within 3 ms, some data packets are required to arrive at a receiver within 10 ms, and some data packets are required to arrive at a receiver within 50 ms.

Optionally, a smaller maximum end-to-end latency indicated by the latency information indicates that a to-be-sent data packet is more urgent or needs to be sent, received, and processed more quickly.

Optionally, the reliability information indicates a reliability requirement of the data packet. Optionally, if the reliability requirement is higher, for example, reliability is required to reach 99.99%, more mechanisms are required during transmission to ensure correct receiving of the data packet, for example, a feedback from a physical layer is required, or more retransmissions are required. If the reliability requirement is lower, for example, reliability is required to reach 90%, a feedback may not be required during transmission, and a quantity of retransmissions may not need to be very large.

Optionally, the data packet size may alternatively be a required transmission rate. Optionally, a larger value of the data packet size indicates a larger size of a packet to be transmitted or a larger amount of information to be transmitted. Otherwise, a smaller value of the data packet size indicates a smaller size of a packet to be transmitted or a smaller amount of information to be transmitted.

Optionally, the minimum communication distance may alternatively be a required minimum communication distance or a minimum required communication distance, and is a minimum distance required to achieve a specific transmission latency, specific transmission reliability, or a specific transmission rate. Optionally, when a distance between the transceivers is less than or equal to the required minimum distance, communication between the transceivers needs to meet the requirements on the transmission latency, reliability, rate, and the like. When a distance between the transceivers is greater than or equal to the required minimum distance, communication between the transceivers does not need to meet the requirements on the transmission latency, reliability, rate, and the like.

Optionally, the quality of service parameter may include the priority information and the minimum communication distance. Specific parameter content included in the quality of service parameter is not limited in this embodiment of this application, and the description herein is merely an example.

Optionally, indication information may indicate one or more of the foregoing quality of service parameters. Optionally, when the first device sends the quality of service parameter of the first data, sidelink control information (SCI) may indicate one or more of the quality of service parameters, or may indicate a part or all of bits of one or more of the quality of service parameters. Optionally, a part of bits of the quality of service parameter may be indicated by using the SCI, and the other part of bits may be indicated by using a media access control (MAC) control element (CE) or an RRC message. Optionally, in the quality of service parameter, a first parameter is indicated by using the SCI, and a second parameter is indicated by using a MAC CE or a radio resource control (RRC) message. Optionally, the first device sends the SCI in a slot of sending the first data.

Optionally, the SCI indicates the priority information in the quality of service parameter. Optionally, the SCI indicates the priority information in the quality of service parameter and the identity of the first zone. Optionally, the SCI indicates the minimum communication distance in the quality of service parameter and the identity of the first zone. Optionally, the SCI indicates the priority information and the minimum communication distance in the quality of service parameter and the identity of the first zone.

Optionally, in the SCI, a 2-bit, 3-bit, or 4-bit field may indicate the minimum communication distance, and a 3-bit, 4-bit, 5-bit, or 6-bit field may indicate the identity of the first zone.

Optionally, a quantity of bits in the SCI that indicate the identity of the first zone may be an even number.

Optionally, before step S301, the method may further include: The first device obtains first configuration information. The first configuration information includes one or more groups of quality of service parameters and one or more zone parameters corresponding to each group of quality of service parameters, and the zone parameter represents a size of a zone. The one or more groups of quality of service parameters include the quality of service parameter of the first data, in other words, the first device may determine, based on the first configuration information, a first zone parameter corresponding to the quality of service parameter of the first data.

For example, one group of quality of service parameters may correspond to one row in Table 1. Similarly, a plurality of groups of quality of service parameters may correspond to a plurality of rows in Table 1. As shown in Table 1, different services correspond to different quality of service parameters, that is, the corresponding quality of service parameters are different in terms of at least one sub-parameter in one or more sub-parameters included in the quality of service parameters. Even services of a same type may correspond to different quality of service parameters, that is, the corresponding quality of service parameters are different in terms of at least one sub-parameter in one or more sub-parameters included in the quality of service parameters. For example, for services having a same latency requirement, minimum required communication distances of the services may be different. Alternatively, for services having a same minimum required communication distance, quality of service parameters corresponding to the services may be the same or different in terms of other one or more sub-parameters.

Optionally, to further distinguish between transmission requirements of different services, a corresponding priority parameter may be further defined for the first data. The priority parameter may indicate information about one or more parameters such as a service type, a latency, and/or reliability in Table 1.

TABLE 1

| Service type | Maximum end-to-end latency (ms) | Reliability (%) | Minimum required communication distance (meter) | Transmission rate (Mbit/s) |
|---|---|---|---|---|
| Vehicle platoon | 10 | 99.99 | 80 | N/A |
| | 20 | N/A | 180 | N/A |
| | 20 | | 350 | 50 |
| Autonomous driving | 3 | 99.999 | 500 | 30 |
| | 100 | N/A | 700 | 10 |
| | 100 | N/A | 360 | 50 |
| Extended sensor | 3 | 99.999 | 200 | 50 |
| | 10 | 99.99 | 500 | 25 |
| | 50 | 99 | 1000 | 10 |
| | 10 | 99.99 | 50 | 1000 |
| | 50 | 90 | 100 | 10 |
| | 10 | 99.99 | 200 | 700 |
| | 10 | 99.99 | 400 | 90 |

For example, the zone parameter may include: a length of the zone, a width of the zone, a length and a width of the zone, or a radius of the zone. For example, when the zone is in a shape of a regular polygon, the zone parameter representing the size of the zone may be the length of the zone or the width of the zone. In this case, each of the length of the zone and the width of the zone may represent a side length of the zone. When the zone is rectangular, the zone parameter representing the size of the zone may be the length of the zone and the width of the zone. When the zone is circular, the zone parameter representing the size of the zone may be the radius. A shape of the zone is not limited in this embodiment of this application, and the descriptions herein are merely examples. For example, the zone may alternatively be in a shape such as a square, a regular hexagon, or a circle.

It may be understood that the first device may obtain the first zone through division based on the size that is of the zone and that is represented by the zone parameter, and the location of the first device is located in the first zone. Therefore, the location of the first device may be indicated by using the first zone at a relatively coarse granularity, and a location of the first zone may be indicated by using the identity of the first zone.

For example, one group of quality of service parameters in the first configuration information may correspond to a plurality of zone parameters, and zone parameters corresponding to different quality of service parameters may be the same or different. This is not limited in this embodiment of this application. For example, when the shape of the zone is a circle and the minimum communication distance is 500 meters, a zone parameter corresponding to the minimum communication distance may be a radius of 50 meters or 100 meters. When the shape of the zone is a circle and the minimum communication distance is 1000 meters, a zone parameter corresponding to the minimum communication distance may also be a radius of 100 meters. The size and the shape of the zone corresponding to the quality of service parameter are not limited in this embodiment of this application, and the descriptions herein are merely examples.

For example, the first configuration information obtained by the first device may be obtained by using preconfigured information, or may be received by the first device and sent by the network device. This is not limited in this embodiment of this application. The first configuration information may be indicated by using instructions from a base station (for example, a system information block (SIB) or RRC signaling), or may be indicated (for example, by using RRC signaling or MAC CE signaling) by another terminal device that performs sidelink communication, or may be configured by using the preconfigured information. Optionally, when the first configuration information is carried in the RRC signaling, the RRC signaling may be UE-common RRC signaling.

For example, a correspondence that is between the quality of service parameter and the zone parameter and that is in the first configuration information may be configured by using explicit signaling, or may be stored in a database in a form of a table. The database may be stored in a software form in the memory 202 shown in FIG. 2, or may be solidified in a hardware form in the processor 201 or another component of the communications device 200 (the first device). This is not limited in this application. It may be understood that the correspondence between the quality of service parameter and the zone parameter in this embodiment of this application may alternatively be determined in another manner, for example, through presetting or pre-definition. For example, when the quality of service parameter is the minimum communication distance, and the shape of the zone is a square, a zone parameter corresponding to the minimum communication distance may be calculated by using the minimum communication distance, that is, the correspondence between the quality of service parameter and the zone parameter may alternatively be expressed by using a formula. A specific representation form of the correspondence between the quality of service parameter and the zone parameter is not limited in this embodiment of this application, and the description herein is merely an example.

For example, the quality of service parameter includes the priority information, and the shape of the zone is a square.

The correspondence between the quality of service parameter and the zone parameter may be indicated by using Table 2A.

TABLE 2A

| Priority information | Zone parameter corresponding to the priority information |
|---|---|
| 0 | L0 |
| 1 | L1 |
| 2 | L2 |
| 3 | L3 |
| 4 | L4 |
| 5 | L5 |
| 6 | L6 |
| 7 | L7 |

For example, the quality of service parameter includes the priority information and the minimum communication distance, and the shape of the zone is a square. The correspondence between the quality of service parameter and the zone parameter may be indicated by using Table 2B.

TABLE 2B

| Priority information | Minimum communication distance (meter) | Zone parameter corresponding to the priority information and the minimum communication distance |
|---|---|---|
| 0 | 50 | L0 |
| 1 | 80 | L1 |
| 2 | 100 | L3 |
| 3 | 200 | L2 and L4 |
| 4 | 400 | L5 |
| 5 | 500 | L3 and L6 |
| 6 | 1000 | L7 |
| 7 | 1500 | L8 |

If the quality of service parameter includes the priority information and the minimum communication distance, and the size of the zone is a square, using an example in which the priority information is a priority of 3 and the minimum communication distance is 200 meters, it can be learned from Table 2B that the zone parameters corresponding to the quality of service parameter include L2 and L4.

For example, if one group of quality of service parameters includes a plurality of sub-parameters, the first configuration information may include a plurality of sub-parameters and a zone parameter corresponding to each sub-parameter. For example, the quality of service parameter includes the priority information and the minimum communication distance, and the shape of the zone is a square. The correspondence between the quality of service parameter and the zone parameter may be indicated in Table 2A and Table 2C.

TABLE 2C

| Minimum communication distance (meter) | Zone parameter corresponding to the minimum communication distance |
|---|---|
| 50 | L0 and L1 |
| 80 | L1 |
| 100 | L2 and L3 |
| 200 | L2 and L4 |
| 400 | L5 |
| 500 | L6 |
| 1000 | L7 |
| 1500 | L8 |

If the quality of service parameter includes the priority information and the minimum communication distance, and the size of the zone is a square, using an example in which the priority information is a priority of 3 and the minimum communication distance is 200 meters, it can be learned from Table 2A that a zone parameter corresponding to the priority of 3 is L3, and it can be learned from Table 2C that zone parameters corresponding to the minimum communication distance of 200 meters include L2 and L4.

It may be understood that the correspondence between the quality of service parameter and the zone parameter may be indicated by using a table, or may be indicated in another manner. When the correspondence is indicated by using a table, one or more tables may be used for indication. This is not limited in this embodiment of this application.

For example, the first configuration information may further include a plurality of resource pools, and each resource pool corresponds to one or more groups of quality of service parameters and/or one or more zone parameters. For example, the first configuration information may include a correspondence between a resource pool and a quality of service parameter corresponding to the resource pool, or the first configuration information may include a correspondence between a resource pool and a zone parameter corresponding to the resource pool, or the first configuration information may include a correspondence between a resource pool and a quality of service parameter and a zone parameter that correspond to the resource pool. It may be understood that the resource pool corresponds to the quality of service parameter and/or the zone parameter, so that a quantity of bits of indication information can be reduced. For example, if the first configuration information includes four resource pools, and each resource pool is associated with a maximum of four minimum communication distances, the first device may use two bits to indicate, in a resource pool used by the first device, quality of service parameters corresponding to the minimum communication distances. If the first configuration information includes one resource pool, the resource pool needs to support parameters of all minimum communication distances, for example, support 16 parameters, four bits indicate quality of service parameters corresponding to the minimum communication distances. Therefore, an indication of the identity of the first zone and an indication of the quality of service parameter that are based on the resource pool can further reduce the quantity of bits of the indication information, to reduce overheads.

For example, that a first device determines, based on a location of the first device and a quality of service parameter of first data, an identity of a first zone in which the first device is located in step S301 includes steps S301a and S301b.

S301a: The first device obtains, based on the quality of service parameter of the first data, the first zone parameter corresponding to the quality of service parameter of the first data.

For example, if the quality of service parameter of the first data is the priority information of the first data, the first device may search for, based on the first configuration information in Table 1, a zone parameter corresponding to the priority information of the first data, and use the zone parameter as the first zone parameter. The first zone parameter is one of one or more zone parameters corresponding to the quality of service parameter of the first data.

For example, with reference to Table 2B, one group of quality of service parameters corresponds to one or more zone parameters. If the quality of service parameter of the first data corresponds to a plurality of zone parameters, a smallest value, an intermediate value, a largest value, an average value, or a smallest zone in the zone parameters corresponding to the quality of service parameter of the first data may be determined as the first zone parameter. This is not limited in this embodiment of this application, and the descriptions herein are merely examples.

For example, if the quality of service parameter of the first data includes the priority information and the minimum communication distance of the first data, the priority information is a priority of 2, and the minimum communication distance is 100 meters, the first device may learn, by querying Table 2B, that zone parameters corresponding to the quality of service parameter are L2 and L3, and a smallest zone in a plurality of zone parameters corresponding to the quality of service parameter may be determined as the first zone parameter.

For example, with reference to Table 2A and Table 2C, if each sub-parameter in the quality of service parameter corresponds to one or more zone parameters, the obtaining the first zone parameter based on the quality of service parameter of the first data may include: determining an intersection set of zone parameters corresponding to a plurality of sub-parameters as the first zone parameter, or determining a smallest value, an intermediate value, a largest value, an average value, or a smallest zone in a plurality of zone parameters corresponding to a plurality of sub-parameters as the first zone parameter. This is not limited in this embodiment of this application, and the descriptions herein are merely examples.

For example, if the quality of service parameter of the first data includes the priority information and the minimum communication distance of the first data, the priority information is a priority of 2, and the minimum communication distance is 100 meters, the first device may learn, by querying Table 2A, that a zone parameter corresponding to the priority of 2 is L2, and may learn, by querying Table 2C, that zone parameters corresponding to the minimum communication distance of 100 meters are L2 and L3. When the first zone parameter is determined based on a plurality of zone parameters corresponding to the two sub-parameters, a smallest zone in the plurality of zone parameters corresponding to the two sub-parameters may be determined as the first zone parameter.

For example, if the quality of service parameter of the first data includes the minimum communication distance, in S301, the first device may alternatively determine the first zone parameter based on the minimum communication distance of the first data and a quantity of bits occupied by a field for indicating the identity of the first zone; or in S301, the first device may alternatively determine the first zone parameter based on the minimum communication distance of the first data and a maximum quantity of identities that is indicated by a field for indicating the identity of the first zone. In other words, in this implementation, the correspondence between the quality of service parameter and the zone parameter corresponding to the quality of service parameter may be expressed by using a formula. It may be understood that the identity of the first zone in this embodiment of this application is the identity of the first zone in which the first device is located.

For example, when q bits in the SCI are used to indicate the identity of the first zone, the first zone parameter $L=Lm/2^{(q/2-1)}$ or $L=Lm*2^{-(q/2-1)}$, where Lm is the minimum communication distance; or optionally, the first zone parameter $L=Lm/2^{(floor(q/2)-1)}$ or $L=Lm*2^{-(floor(q/2)-1)}$, where floor( ) represents rounding down to an integer. For example, when Lm=100 meters, and q=4 bits are used to indicate 16 identities of first zones, the first zone parameter L=100 meters/2=50 meters. For another example, when Lm=100 meters, and q=6 bits are used to indicate 16 identities of first zones, the first zone parameter L=100 meters/4=25 meters. Optionally, when the first zone parameter is calculated in a rounding-down manner, the quantity q of bits of the field that is in the SCI and that indicates the identity of the first zone may be an even number, or may be an odd number. For example, when Lm=100 meters, and q=5 bits are used to indicate 16 identities of first zones, the first zone parameter L=100 meters/2=50 meters.

It may be understood that, in this embodiment of this application, the quality of service parameter of the data corresponds to the zone parameter, and the zone parameter corresponding to the quality of service parameter may be obtained based on the quality of service parameter, so that when the location of the first device is obtained through division at a relatively coarse granularity, the division may be performed with reference to the quality of service parameter of the data currently transmitted by the first device. In this way, the size of the zone obtained through division is more appropriate.

S301b: The first device determines the identity of the first zone based on the first zone parameter and the location of the first device.

For example, that the first device determines the identity of the first zone based on the first zone parameter and the location of the first device may include: The first device determines the first zone and the identity of the first zone based on the first zone parameter and the location of the first device, where the location of the first device is located in the first zone.

For example, when the zone obtained through division is rectangular, the first device may determine, based on the first zone parameter and the location of the first device, the identity of the first zone in which the first device is located, wherein the identity of the first zone meets the following formulas:

$$x_1 = \text{Floor}(x/L) \text{Mod } Nx;$$

$$y_1 = \text{Floor}(y/W) \text{Mod } Ny; \text{ and}$$

$$\text{Zone\_id} = y_1 * Nx + x_1.$$

Zone_id is the identity of the first zone, $x_1$ and $y_1$ are intermediate variables for calculating Zone_id, $x_1$ and $y_1$ are positive integers, (x, y) is coordinates of the location of the first device, L represents the length of the zone, W represents the width of the zone, Nx represents a quantity of grids obtained through division on a horizontal axis (or in a horizontal direction or a longitude direction), Ny represents a quantity of grids obtained through division on a vertical axis (or in the horizontal direction or the longitude direction), Floor represents rounding down to an integer, and Mod represents a modulo operation.

For example, when the zone is in a shape of a square, a quantity of grids on a horizontal axis (or in a horizontal direction or a longitude direction) and/or a quantity of grids on a vertical axis (or in the horizontal direction or the longitude direction) may be determined based on a total quantity M of indicated identities of first zones or a quantity n of bits of signaling for indicating identities of first zones.

For example, when the zone obtained through division is in the shape of a square, the identity of the first zone in which the first device is located is determined, wherein the identity of the first zone meets the following formulas:

$x_1 = \text{Floor}(x/L) \text{Mod } Nm;$ $y_1 = \text{Floor}(y/L) \text{Mod } Nm;$ and $\text{Grid\_id} = y_1 * Nm + x_1.$ Grid_id is the identity of the first zone, $x_1$ and $y_1$ are intermediate variables for calculating Grid_id, $x_1$ and $y_1$ are positive integers, (x, y) is coordinates of the location of the first device, L represents a side length of the square, Nm represents the quantity of grids obtained through division on the horizontal axis (or in the horizontal direction or the longitude direction) and the quantity of grids obtained through division on the vertical axis (or in the horizontal direction or the longitude direction), Floor represents rounding down to an integer, and Mod represents a modulo operation. Optionally, when the zone is in the shape of a square, a value of Nm is the square root of the total quantity M of grids. In other words, $Nm = \sqrt{M}$. Optionally, when the zone is in the shape of a square, a value of Nm may alternatively be represented as $Nm = 2^{n/2}$, where $M = 2^n$. Optionally, n may be the total quantity of bits indicating the identities of the first zones.

For example, when the total quantity M of the identities that are of the first zones and that are indicated by the signaling is 16, Nm=4. That is, there are four grids on each of the horizontal axis (or in the horizontal direction or the longitude direction) and the vertical axis (or in the horizontal direction or the longitude direction).

For example, when the zone is in the shape of a square, the identity of the first zone in which the first device is located may be determined according to the following formulas.

Figure 4:
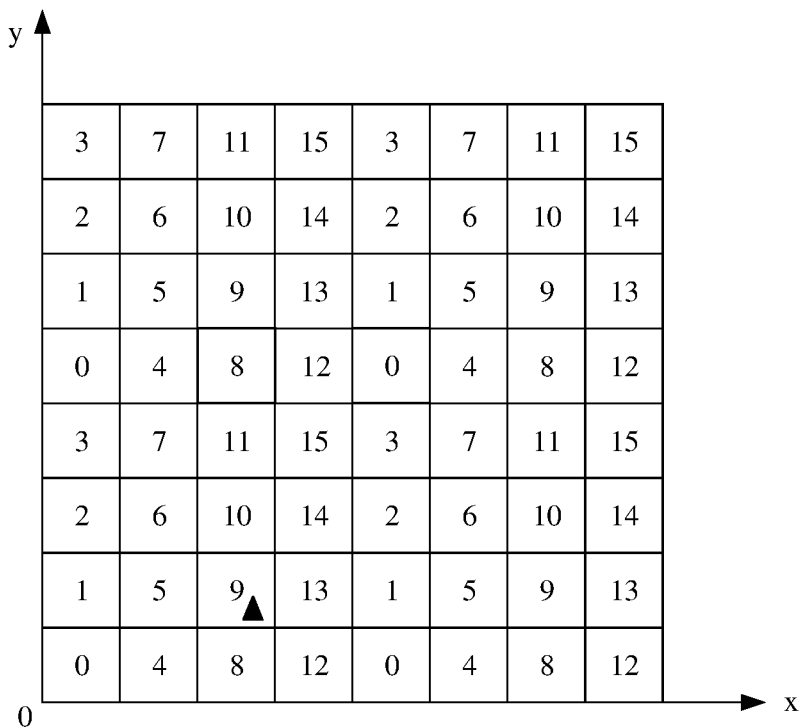
FIG. 4 is a schematic application diagram of a communication method according to an embodiment of this application.

For example, the identity of the first zone is four bits, and the zone obtained through division is in the shape of a square. As shown in FIG. 4, a location of a coordinate point is used as a reference origin (0, 0), coordinates of a geographical location may be divided into 16 grids, there are four grids in each of the horizontal direction and a vertical direction, identities of the grids are from 0 to 15, and each grid represents a zone. If the side length of the square is 25 meters (both the length and the width are 25 meters), the location of the first device is (30, 50), and Nm is 4, $x_1$=Floor (30/25) Mod 4=1, $y_1$=Floor (50/25) Mod 4=2, and the identity Zone_id of the first zone is 9. In other words, the identity of 9 may be used to indicate the location of the first device at a relatively coarse granularity.

It should be noted that, in this embodiment of this application, when the geographical location is divided at a relatively coarse granularity, the division is performed based on the quality of service parameter of the data transmitted by the first device. Therefore, the granularity of dividing the geographical location corresponds to the quality of service parameter. For example, according to the method, the first zone can be obtained through division at a finer granularity when the minimum communication distance of the first data is smaller, and may be obtained through division at a coarser granularity when the minimum communication distance of the first data is larger, so that the zone obtained through division is associated with the quality of service parameter of the data; and when quality of service parameters are different, first zones corresponding to the quality of service parameters can be obtained through division. In this way, when the quantity of bits indicating the identity of the first zone is fixed and limited, corresponding sizes of zones can be set for different minimum communication distances. This improves precision of indicating a location corresponding to the identity of the first zone.

S302: The first device sends the indication information.

The indication information includes first information, and the first information indicates the identity of the first zone. The first information may be carried in the SCI, or may be carried in a MAC message, an RRC message, or an application layer message. Alternatively, a part of bits may be carried in the SCI, and the other part of bits may be carried in a MAC message, an RRC message, or an application layer message. A most significant bit (MSB) is carried in the MAC message, the RRC message, or the application layer message, and a least significant bit (LSB) is carried in the SCI. The indication information is carried on a physical sidelink control channel (PSCCH), and/or the first data is carried on a physical sidelink shared channel (PSSCH).

For example, the first information may indicate a part or all of the bits occupied by the identity of the first zone, and the part of the bits are the least significant bit (LSB) of the identity of the first zone. For example, when the identity of the first zone and the first information each are indicated by four bits in the SCI, the first information may indicate all the bits occupied by the identity of the first zone. For another example, when the identity of the first zone is indicated by four bits in the SCI, and the first information is indicated by only two bits in the SCI, the first information may indicate two least significant bits of the identity of the first zone, and two most significant bits may be carried in the MAC message, the RRC message, or the application layer message. For another example, when a total quantity of bits required to indicate the identity of the first zone is 10, but a quantity of bits that can be used for indication in the SCI is 3, the three bits in the SCI may be used to indicate three least significant bits of the identity of the first zone, and seven most significant bits may be carried in the MAC message, the RRC message, or the application layer message.

For example, the identity of the first zone may correspond to a first resource pool, and the first resource pool is used by the first device to send the first data. It may be understood that the identity of the first zone may correspond to one resource pool, and the first device may send the first data in the resource pool corresponding to the identity of the first zone.

In an implementation, the indication information may further include second information, and the second information indicates the quality of service parameter of the first data. For example, the indication information includes the identity of the first zone, a priority of the first data, and the minimum communication distance of the first data. It may be understood that the first device may send the quality of service parameter of the first data, so that the second device determines, based on the quality of service parameter, the first zone parameter corresponding to the quality of service parameter, to learn of the zone parameter used when the first device obtains the first zone through division.

For example, the quality of service parameter of the first data may be indicated by using the SCI, or a part or all of bits of the quality of service parameter of the first data may be indicated by using the SCI, or the quality of service parameter of the first data may be indicated by using MAC CE signaling, RRC signaling, or preconfigured signaling. Optionally, a part of bits of the quality of service parameter of the first data may be indicated by using the SCI, and the other part of bits may be indicated by using the MAC CE signaling, the RRC signaling, or the preconfigured signaling.

In another implementation, the indication information may further include third information, and the third information indicates the first zone parameter corresponding to the quality of service parameter of the first data. It may be understood that when the quality of service parameter of the first data corresponds to a plurality of zone parameters, the first zone parameter may be carried in the indication information, and the first zone parameter is a zone parameter for calculating the identity of the first zone, so that the second device learns of the zone parameter used when the first device obtains the first zone through division.

For example, the first zone parameter may be indicated by using the SCI, or a part or all of bits of the first zone parameter may be indicated by using the SCI, or the first zone parameter may be indicated by using the MAC CE signaling, the RRC signaling, or the preconfigured signaling. Optionally, a part of bits of the first zone parameter may be indicated by using the SCI, and the other part of bits may be indicated by using the MAC CE signaling, the RRC signaling, or the preconfigured signaling.

In another implementation, the indication information may further include fourth information, the fourth information indicates an identity of a second zone, and the identity of the second zone is an identity that is of the second zone in which the first device is located and that is determined by the first device based on the location of the first device and a second zone parameter. The second zone parameter is different from the first zone parameter. In other words, the first device may perform division into zones based on another zone parameter. For example, the second zone parameter may be a zone parameter used to perform division based on a geographical zone in a conventional technology. It may be understood that the first device sends the identity of the second zone, so that the second device can determine a specific location of the first device based on identities that are of two zones and that are obtained according to different division rules.

For example, the identity of the second zone may be indicated by using the SCI, or a part or all of bits occupied by the identity of the second zone may be indicated by using the SCI, or the identity of the second zone may be indicated by using the MAC CE signaling, the RRC signaling, or the preconfigured signaling. Optionally, a part of bits occupied by the identity of the second zone may be indicated by using the SCI, and the other part of bits may be indicated by using the MAC CE signaling, the RRC signaling, or the preconfigured signaling.

In another implementation, the indication information may further include fifth information, and the fifth information indicates the location of the first device and/or speed information of the first device.

For example, the location of the first device and/or the speed information of the first device may be indicated by using the SCI, or a part or all of bits of the location of the first device and/or the speed information of the first device may be indicated by using the SCI, or the location of the first device and/or the speed information of the first device may be indicated by using the MAC CE signaling, the RRC signaling, or the preconfigured signaling. Optionally, a part of bits of the location of the first device and/or the speed information of the first device may be indicated by using the SCI, and the other part of bits may be indicated by using the MAC CE signaling, the RRC signaling, or the preconfigured signaling.

In another implementation, the indication information may further include sixth information, and the sixth information indicates the second device to determine, based on signal quality and/or a distance between the first device and the second device, whether to send feedback information, where the second device is a device that receives the indication information. The sixth information may be carried in the SCI, and is indicated by using one bit in the SCI. For example, the sixth information may be indicated by using the SCI, so that the second device determines, based on the signal quality and/or the distance between the first device and the second device, whether to send the feedback information.

In another implementation, the indication information may further include seventh information, and the seventh information indicates that a higher layer message includes one or more of followings: the identity of the first zone, the location of the first device, or the quality of service parameter. The higher layer message includes the media access control MAC message, the RRC message, or the application layer message. For example, the seventh information may be indicated by using the SCI, so that the second device can obtain one or more of followings: the identity of the first zone, the location of the first device, or the quality of service parameter from the higher layer message.

Optionally, if a latency corresponding to the first data is less than or equal to a preconfigured or predefined first latency parameter, one or more of the first information, the second information, the third information, the fourth information, the fifth information, the sixth information, or the seventh information may be carried in the SCI. For example, the preconfigured or predefined first latency parameter may be 3 ms. Specific duration indicated by the preconfigured or predefined first latency parameter is not limited in this embodiment of this application, and the description herein is merely an example.

Optionally, if a latency corresponding to the first data is greater than or equal to a preconfigured or predefined second latency parameter, one or more of the first information, the second information, the third information, the fourth information, or the fifth information are carried in the MAC message, the RRC message, or the application layer message. For example, the preconfigured or predefined second latency parameter may be 10 ms. Specific duration indicated by the preconfigured or predefined second latency parameter is not limited in this embodiment of this application, and the description herein is merely an example.

S303: The second device receives the indication information sent by the first device.

For example, the second device is a receiver when receiving the first data.

S304: The second device determines the distance between the second device and the first device based on the indication information and a location of the second device.

The indication information includes the first information, and the first information indicates the identity of the first zone. The identity of the first zone may indicate the location of the first device at a relatively coarse granularity.

The location of the second device may be a geographical location of the second device. The geographical location of the second device may be GPS coordinates or BeiDou location coordinates of the second device, an identity of a third zone in which the second device is located, or the like. This is not limited in this embodiment of this application. It should be noted that the coordinates of the location of the second device in step S304 and the coordinates of the location of the first device in step S301 are coordinates in a same coordinate system.

In an implementation, the indication information may further include the second information, and the second information indicates the quality of service parameter of the first data. In this implementation, step S304 may include: The second device may determine the distance between the second device and the first device based on the identity of the first zone, the quality of service parameter of the first data, and the location of the second device.

For example, if the quality of service parameter of the first data is the minimum communication distance, the second device may learn of a division principle for the first zone based on the minimum communication distance, may learn of, with reference to coordinates of the reference origin, a location represented by the identity of the first zone at a relatively coarse granularity, and then may determine the distance between the first device and the second device with reference to the location of the second device.

Optionally, before step S304, the method may further include: The second device obtains second configuration information, where the second configuration information includes one or more groups of quality of service parameters and one or more zone parameters corresponding to each group of quality of service parameters, and the zone parameter represents a size of a zone. The one or more groups of quality of service parameters include the quality of service parameter of the first data, in other words, the second device may determine, based on the second configuration information, the first zone parameter corresponding to the quality of service parameter of the first data. It may be understood that, a manner in which the second device obtains the second configuration information and content of the second configuration information, refers to the manner in which the first device obtains the first configuration information and the related descriptions of the content of the first configuration information in step S301. Details are not described herein again. It should be noted that the second configuration information may be the same as or different from the first configuration information. This is not limited in this embodiment of this application.

For example, the second configuration information may be indicated by using instructions from a base station (for example, a SIB or RRC signaling), or may be indicated (for example, by using RRC signaling or MAC CE signaling) by another terminal device that performs sidelink communication, or may be configured by using preconfigured information.

It may be understood that the second device may determine, based on the quality of service parameter of the first data, the first zone parameter corresponding to the quality of service parameter, to learn of the division principle used when the first device obtains the first zone through division, and determine the zone location (the location of the first device) indicated by the identity of the first zone. Then, the second device may determine the distance between the location of the second device and the location of the first device with reference to the location of the second device. Because division into the first zone is related to the quality of service parameter of a service, the location of the first device may be indicated by using the zone size corresponding to the quality of service parameter, to indicate the location of the first device at a more appropriate granularity.

In another implementation, the indication information may further include the third information, and the third information indicates the first zone parameter corresponding to the quality of service parameter of the first data. In this implementation, step S304 may include: The second device determines the distance between the second device and the first device based on the identity of the first zone, the first zone parameter, and the location of the second device. It may be understood that when the quality of service parameter of the first data corresponds to a plurality of zone parameters, the first zone parameter may be carried in the indication information, and the first zone parameter is the zone parameter for calculating the identity of the first zone, so that the second device learns of the zone parameter used when the first device obtains the first zone through division.

In another implementation, the indication information may further include the fourth information, and the fourth information indicates the identity of the second zone. The identity of the second zone is the identity that is of the second zone in which the first device is located and that is determined by the first device based on the location of the first device and the second zone parameter. The second zone parameter is different from the first zone parameter. In other words, the first device may perform division into zones based on another zone parameter. For example, the second zone parameter may be the zone parameter used to perform division based on the geographical zone in the conventional technology.

For example, a range included in the second zone may be larger than a range included in the first zone, and for example, may include the first zone and further include a zone other than the first zone. Alternatively, a range included in the first zone is larger than a range included in the second zone. This is not limited in this embodiment of this application.

In this implementation, step S304 may include: The second device may determine the distance between the second device and the first device based on the identity of the first zone, the identity of the second zone, and the location of the second device. With reference to FIG. 4, when division into zones is performed based on 4×4 grids, if the identity of the first zone is 9, as shown in FIG. 4, there are a plurality of zones whose identities are 9. Therefore, a specific zone whose identity is 9 may fail to be accurately learned of based on the identity of the first zone and the first zone parameter. Therefore, the identity of the second zone may be used. The identity of the second zone may be an identity of a zone that is obtained when the location of the first device is obtained through division based on another zone parameter. The specific zone whose zone identity is 9 may be determined based on the identities of the two zones that are obtained at the two different division granularities, to remove ambiguity of the identity of the first zone. If it is determined, based on the identity of the first zone and the identity of the second zone, that the zone represented by the identity 9 of the first zone is a zone in which a triangle is located in FIG. 4, the distance between the first device and the second device may be determined based on a location of the zone and the location of the second device.

It may be understood that the second device may remove the ambiguity of the identity of the first zone based on the identities of the two zones obtained at different division granularities, to determine a relatively accurate location of the first device, and then determine the distance between the first device and the second device. The distance that is between the first device and the second device and that is determined in this implementation is more accurate.

In another implementation, the indication information may further include the fifth information, and the fifth information indicates the location of the first device and/or the speed information of the first device. In this implementation, step S304 may include: The second device determines the distance between the second device and the first device based on the identity of the first zone, the fifth information, and the location of the second device. For example, the speed information of the first device may be a speed of the first device, an acceleration of the first device, and/or a moving direction of the first device. Specific content of the speed information of the first device is not limited in this embodiment of this application, and the descriptions herein are merely examples.

For example, if the fifth information indicates the location of the first device, the second device may determine the distance between the second device and the first device based on the identity of the first zone, the fifth information, and the location of the second device. It may be understood that, because the identity of the first zone has the ambiguity, the ambiguity of the identity of the first zone may be removed based on the location of the first device. Specifically, using an example in which a moving speed of a vehicle is 360 km/h, a location of the vehicle changes only by 0.1 meter in 1 ms, and changes only by 1 meter in 10 ms, and a data transmission speed is at a millisecond level. Therefore, the ambiguity of the identity of the first zone may be further removed based on the location of the first device. For example, a specific zone 9 in FIG. 4 that is indicated by the identity 9 of the first zone may be determined based on the location of the first device and the identity of the first zone, to relatively accurately determine the location of the first device, and then the distance between the first device and the second device is determined, so that the distance between the first device and the second device is more accurate.

For example, if the fifth information indicates the speed information of the first device, the second device may determine the distance between the second device and the first device based on the identity of the first zone, the speed information of the first device, and the location of the second device. It may be understood that the second device may determine the location of the first device based on the speed information of the first device and location information that is at a historical moment, and remove the ambiguity of the identity of the first zone with reference to the identity of the first zone. For example, a specific zone 9 in FIG. 4 that is indicated by the identity 9 of the first zone may be determined based on the speed of the first device, the moving direction of the first device, a location that is of the first device and that is at a previous moment, and the identity of the first zone, to relatively accurately determine the location of the first device, and then the distance between the first device and the second device is determined, so that the distance between the first device and the second device is more accurate.

For example, the fifth information indicates the location of the first device and the speed information of the first device, and the second device may determine the distance between the second device and the first device based on the identity of the first zone, the location of the first device, the speed information of the first device, and the location of the second device. It may be understood that the second device may determine, based on the location of the first device and the speed information of the first device, a specific location that is of the first device and that is at a current moment, and remove the ambiguity of the identity of the first zone with reference to the identity of the first zone. For example, a specific zone 9 in FIG. 4 that is indicated by the identity 9 of the first zone may be determined based on the speed of the first device, the moving direction of the first device, the location of the first device, and the identity of the first zone, to relatively accurately determine the location of the first device, and then the distance between the first device and the second device is determined, so that the distance between the first device and the second device is more accurate.

In another implementation, the indication information may further include the seventh information, and the seventh information indicates that the higher layer message includes one or more of followings: the identity of the first zone, the location of the first device, or the quality of service parameter. In this implementation, the second device may further obtain one or more of followings: the identity of the first zone, the location of the first device, or the quality of service parameter from the higher layer message based on the seventh information, to determine the location of the first device, so that the distance between the second device and the first device can be relatively accurately determined.

For example, step S304 may include: The second device determines the first zone parameter based on the quality of service parameter of the first data. The second device determines, based on the first zone parameter and the location of the second device, the identity of the third zone in which the second device is located. The second device determines the distance between the second device and the first device based on the identity of the first zone and the identity of the third zone. In this case, the second device may obtain the location of the second device through division according to the same division principle as that used for the first zone in which the first device is located, to obtain the identity of the third zone in which the location of the second device is located. It may be understood that the identity of the second zone and the identity of the first zone are identities obtained through division in the same reference coordinate system, and the zone parameter for obtaining the first zone through division may be the same as a zone parameter for obtaining the third zone through division.

In another implementation, step S304 may further include: The second device obtains the signal quality of the first data, and determines the distance between the second device and the first device based on the identity of the first zone, the signal quality of the first data, and the location of the second device.

For example, the signal quality may include any one or more of a reference signal received power (RSRP), reference signal received quality (RSRQ), or a received signal strength indicator (RSSI).

Figure 5:
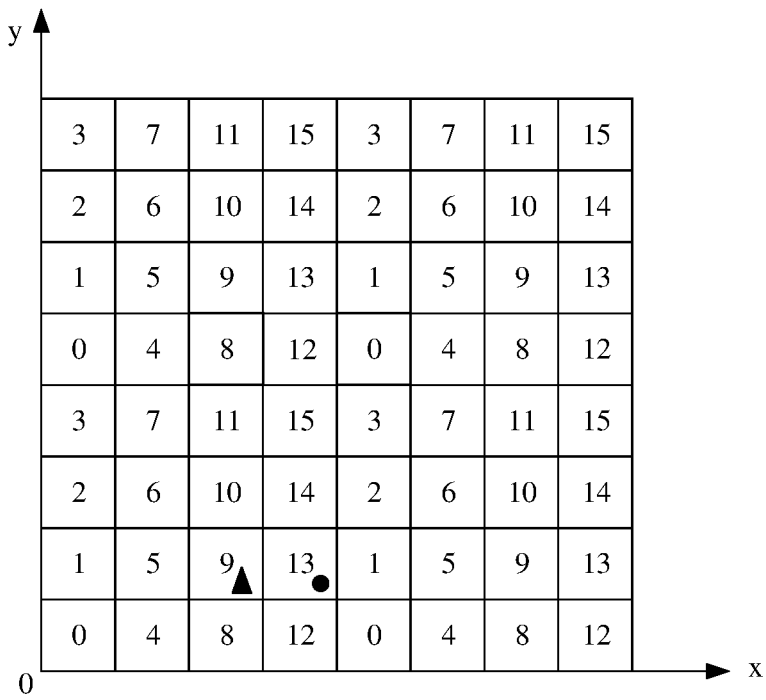
FIG. 5 is another schematic application diagram of a communication method according to an embodiment of this application.
Figure 6:
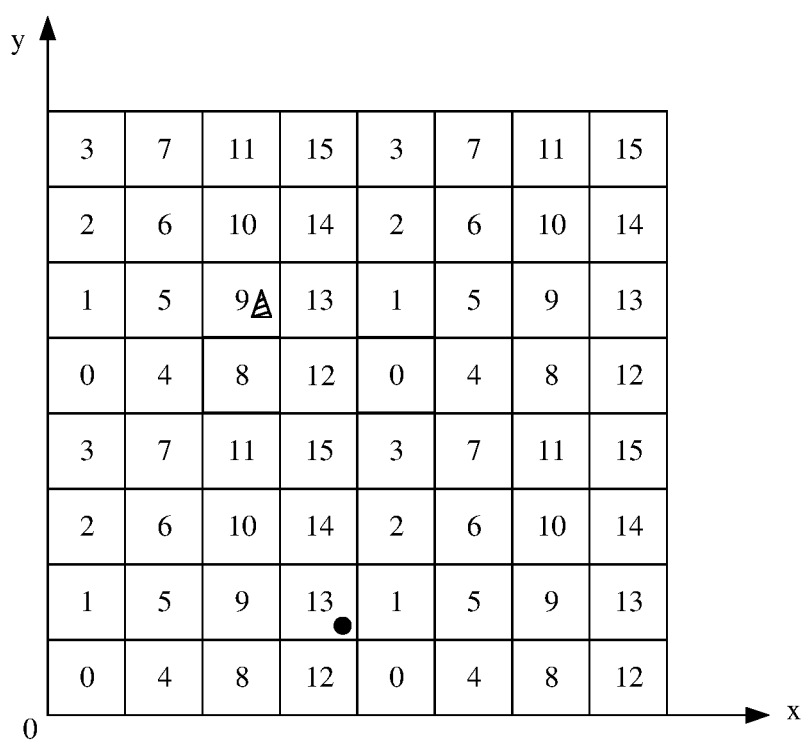
FIG. 6 is another schematic application diagram of a communication method according to an embodiment of this application.

For example, in this implementation, the second device may determine a specific identity of the first zone with reference to a value of the signal quality of the first data and the location of the second device. For example, the second device is located in a zone whose identity is 13 (a zone whose identity is 13 and in which a black circle is located in FIG. 5 and FIG. 6), and the identity of the first zone in which the first device is located is 9. If the signal quality of the first data is greater than or equal to a preset threshold, as shown in FIG. 5, the second device may determine that the first zone whose identity is 9 is a zone whose identity is 9 and that is adjacent to the second zone whose identity is 13 (a zone whose identity is 9 and in which a black triangle is located in FIG. 5). If the signal quality of the first data is less than or equal to another preset threshold, as shown in FIG. 6, the second device may determine that the first zone whose identity is 9 is a zone whose identity is 9 and that is relatively far away from the second zone whose identity is 13 (a zone whose identity is 9 and in which a black triangle filled with oblique lines is located in FIG. 6). In other words, the ambiguity of the identity of the first zone can be further removed by using the signal quality, to improve accuracy of the location of the first device, so that the determined distance between the first device and the second device is more accurate.

In another implementation, step S304 may further include: The second device obtains the signal quality of the first data, and determines the distance between the second device and the first device based on the identity of the second zone, the signal quality of the first data, and the location of the second device. In other words, the second device may further remove ambiguity of the identity of the first zone with reference to the signal quality of the first data, so that the determined distance between the first device and the second device is relatively accurate.

In another implementation, the second device may alternatively determine the distance between the second device and the first device based on a change of the signal quality of the first data and information included by the first device in a higher layer message at a moment before the current moment. It may be understood that in this implementation, there is a specific relationship between the change of the signal quality and a change of the distance. A current location of the first device may be determined based on the change of the signal quality, and the distance between the second device and the first device may be determined based on the location of the first device and the location of the second device.

According to the communication method provided in this embodiment of this application, the first device determines, based on the location of the first device and the quality of service parameter of the first data, the identity of the first zone in which the first device is located, and sends the indication information. The second device receives the indication information sent by the first device, and determines the distance between the second device and the first device based on the indication information and the location of the second device. In this embodiment, the identity of the first zone in which the first device is located is determined by using the quality of service parameter of the first data, so that the first zone in which the first device is located can be obtained through more proper division based on the quality of service parameter of the transmitted data, and the distance that is between the first device and the second device and that is determined based on the division granularity is relatively accurate, thereby improving the data transmission reliability and improving an autonomous driving or advanced driver assistance systems (ADAS) capability of an electric vehicle.

Figure 7:
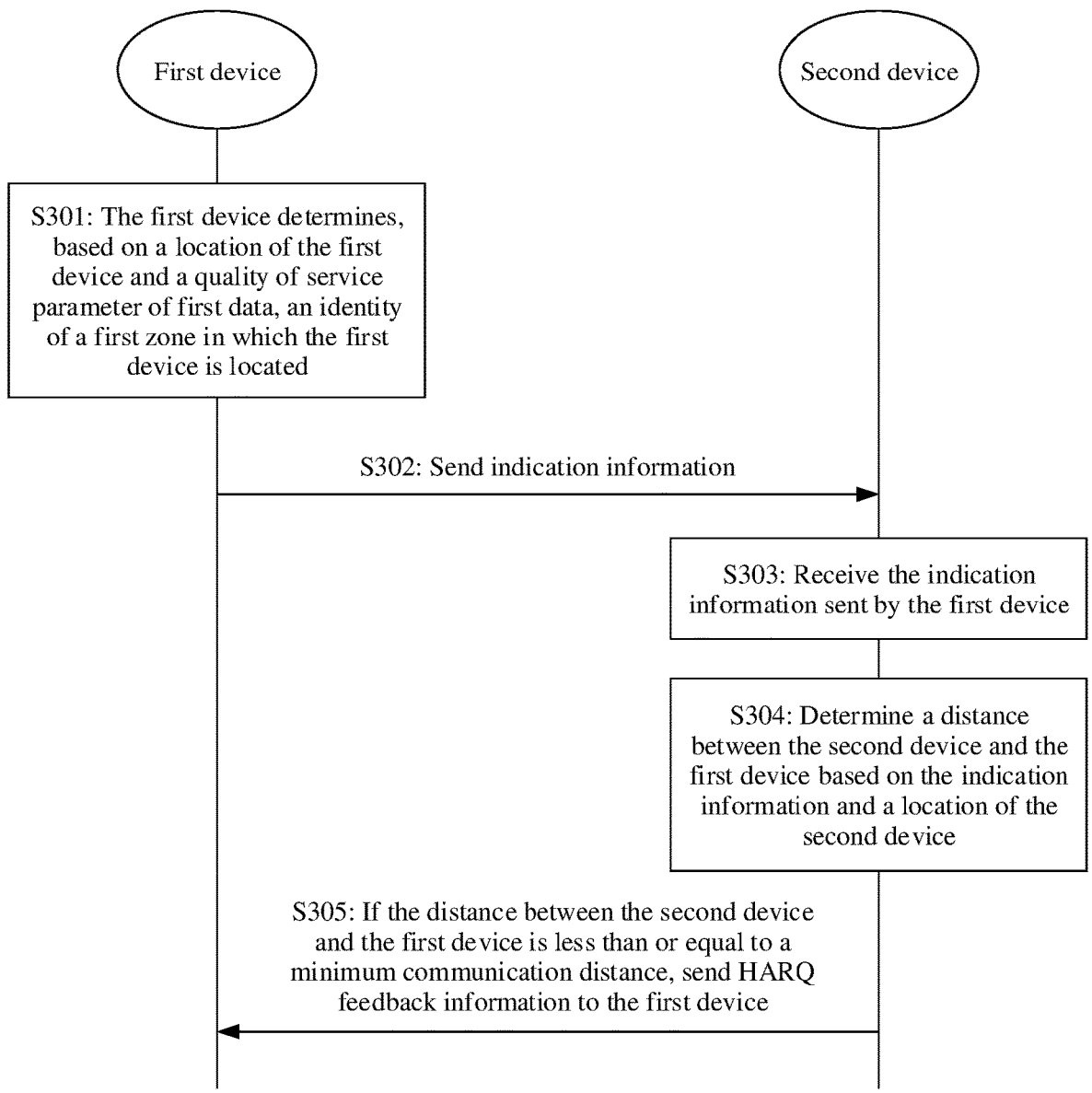
FIG. 7 is another schematic flowchart of a communication method according to an embodiment of this application.

An embodiment of this application further provides a communication method. If the indication information may further include the sixth information, and the sixth information indicates the second device to determine, based on the distance between the first device and the second device, whether to send the feedback information, as shown in FIG. 7, after step S304, the method may further include step S305.

S305: If the distance between the second device and the first device is less than or equal to the minimum communication distance, the second device sends hybrid automatic repeat request (HARQ) feedback information to the first device.

For example, if the distance that is between the second device and the first device and that is calculated in step S305 is less than or equal to the minimum communication distance, it is determined that the distance between the second device and the first device can meet reliability of transmitting the first data, and the second device may send the HARQ feedback information to the first device. For example, when the distance between the second device and the first device is less than or equal to the minimum communication distance, and when the second device acknowledges that the first data sent by the first device has been received, the second device sends an acknowledgement (ACK) to the first device. When the second device has not received the first data sent by the first device, the second device sends a negative acknowledgement (NACK) to the first device. Optionally, if the second device sends the NACK to the first device, the first device may further send the first data to the second device again. The HARQ feedback information may be carried on a physical sidelink feedback channel (PSFCH).

For example, the HARQ feedback information is an explicit field on a feedback channel sent by the second device. Optionally, when the HARQ feedback information sent by the second device is a first value, it indicates that the second device is located within the minimum communication distance. When the HARQ feedback information sent by the second device is a second value, it indicates that the second device is located beyond the minimum communication distance. The HARQ feedback information may be the ACK or the NACK, or may be a dedicated field in the feedback information. For example, for 1-bit feedback information, when the first value is 1, the second value is 0.

For example, the HARQ feedback information is implicitly indicated by a transmission resource occupied by a feedback channel sent by the second device, so that signaling overheads can be reduced. Optionally, the feedback information may alternatively be the transmission resource used to transmit the HARQ feedback information. The transmission resource occupied by the feedback channel includes at least one of a time domain resource, a frequency domain resource, and a sequence. When a first transmission resource is used, it indicates that the second device is located within the minimum communication distance. When a second transmission resource is used to send the HARQ feedback information by the second device, it indicates that that the second device is located beyond the minimum communication distance. Optionally, different feedback resources are different time domain resources, frequency domain resources, and/or sequences that are used.

According to the communication method provided in this embodiment of this application, the first device determines, based on the location of the first device and the quality of service parameter of the first data, the identity of the first zone in which the first device is located, and sends the indication information. The second device receives the indication information sent by the first device, and determines the distance between the second device and the first device based on the indication information and the location of the second device. If the distance between the second device and the first device is less than or equal to the minimum communication distance, the second device sends the HARQ feedback information to the first device. In this embodiment, the identity of the first zone in which the first device is located is determined by using the quality of service parameter of the first data, so that the first zone in which the first device is located can be obtained through more proper division based on the quality of service parameter of the transmitted data, and the distance that is between the first device and the second device and that is determined based on the division granularity is relatively accurate, thereby improving data transmission efficiency and reliability, and improving the autonomous driving or advanced driver assistance systems ADAS capability of the electric vehicle.

Figure 8A:
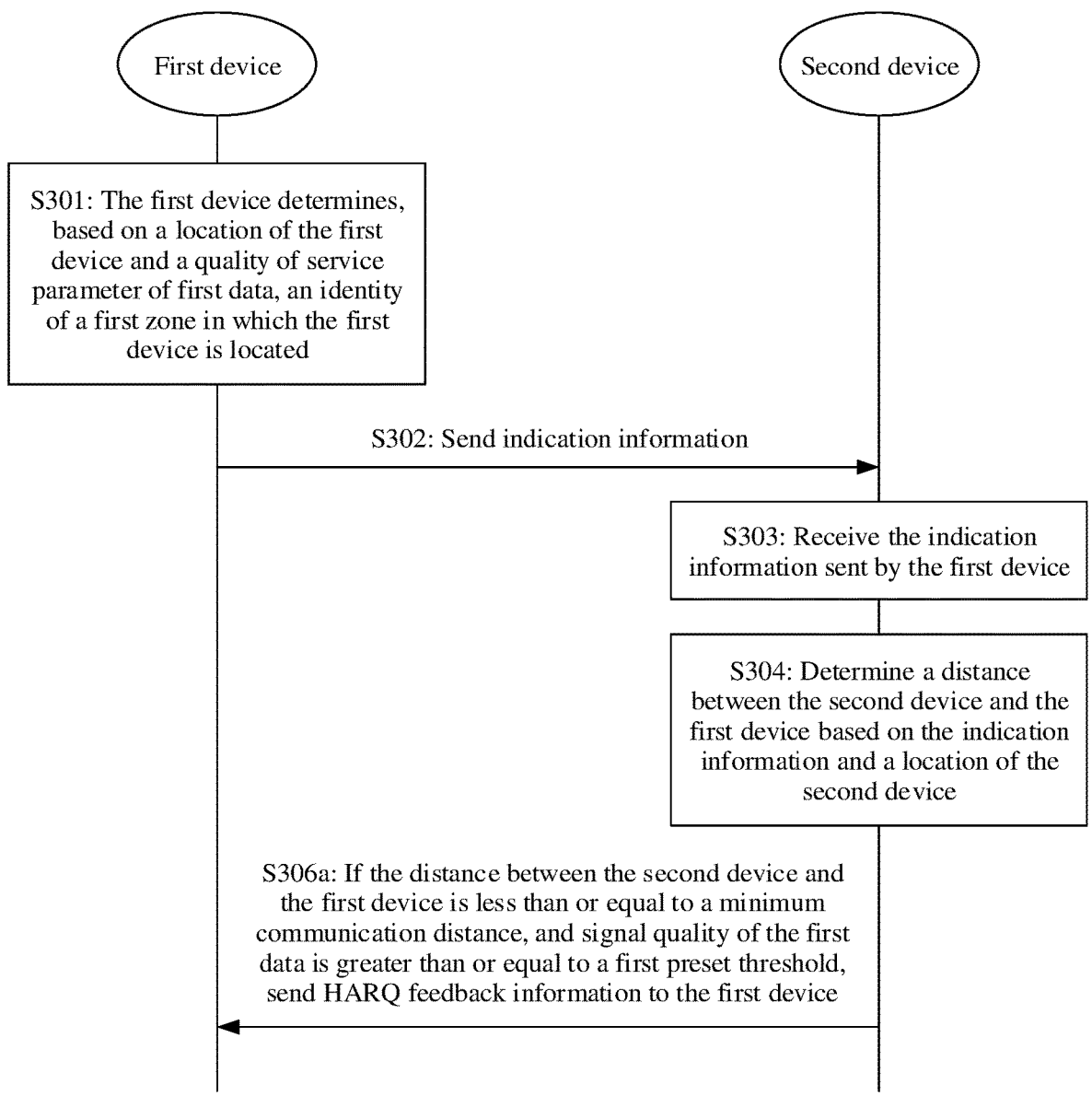
FIG. 8(a) is another schematic flowchart of a communication method according to an embodiment of this application.
Figure 8B:
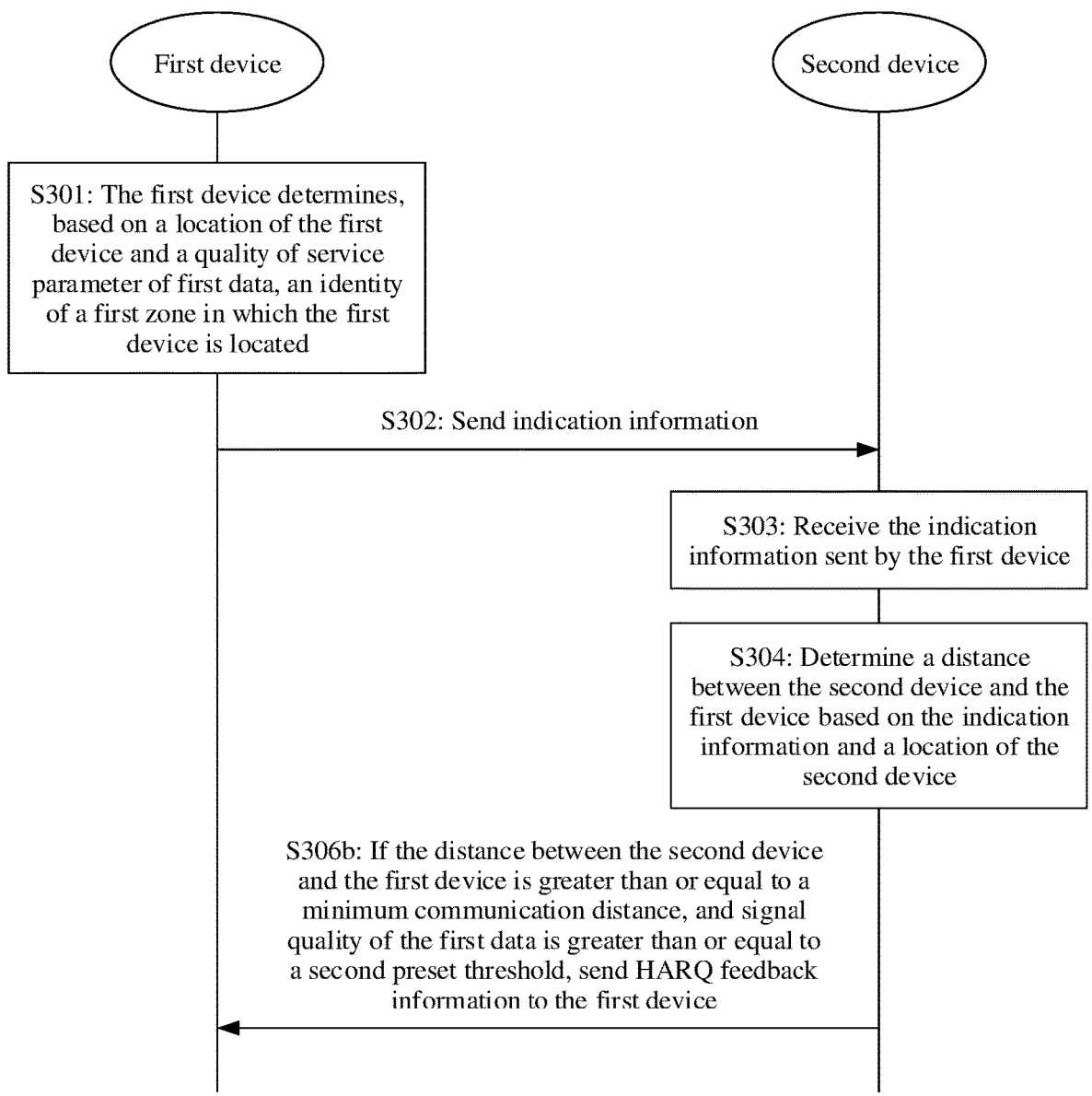
FIG. 8(b) is another schematic flowchart of a communication method according to an embodiment of this application.

An embodiment of this application further provides a communication method. If the indication information may further include the sixth information, and the sixth information indicates the second device to determine, based on the signal quality and the distance between the first device and the second device, whether to send the feedback information, as shown in FIG. 8(a), after step S304, the method may further include step S306a; or as shown in FIG. 8(b), after step S304, the method may further include step S306b.

S306a: If the distance between the second device and the first device is less than or equal to the minimum communication distance, and the signal quality of the first data is greater than or equal to a first preset threshold, the second device sends HARQ feedback information to the first device.

For example, the second device may determine, based on both the distance between the second device and the first device and the signal quality of the first data, whether to send the HARQ feedback information to the first device. For example, when the distance between the second device and the first device is less than or equal to the minimum communication distance, and the signal quality of the first data is relatively strong (is greater than or equal to the first preset threshold), the second device may send an ACK or a NACK to the first device.

S306b: If the distance between the second device and the first device is greater than or equal to the minimum communication distance, and the signal quality of the first data is greater than or equal to a second preset threshold, the second device sends HARQ feedback information to the first device.

For example, the second device may determine, based on both the distance between the second device and the first device and the signal quality of the first data, whether to send the HARQ feedback information to the first device. For example, when the distance between the second device and the first device is greater than or equal to the minimum communication distance, and the signal quality of the first data is relatively strong (is greater than or equal to the second preset threshold), the second device may send an ACK or a NACK to the first device. The second preset threshold may be the same as or different from the first preset threshold. This is not limited in this embodiment of this application.

It may be understood that the first preset threshold or the second preset threshold in this embodiment of this application may be indicated by using instructions from a base station (for example, a SIB or RRC signaling), or may be indicated (for example, by using RRC signaling or MAC CE signaling) by another terminal device that performs sidelink communication, or may be configured by using preconfigured information.

According to the communication method provided in this embodiment of this application, the first device determines, based on the location of the first device and the quality of service parameter of the first data, the identity of the first zone in which the first device is located, and sends the indication information. The second device receives the indication information sent by the first device, and determines the distance between the second device and the first device based on the indication information and the location of the second device. If the distance between the second device and the first device is less than or equal to the minimum communication distance, and the signal quality of the first data is greater than or equal to the first preset threshold, the second device sends the HARQ feedback information to the first device. In this embodiment, the identity of the first zone in which the first device is located is determined by using the quality of service parameter of the first data, so that the first zone in which the first device is located can be obtained through more proper division based on the quality of service parameter of the transmitted data, and the distance that is between the first device and the second device and that is determined based on the division granularity is relatively accurate.

Figure 9:
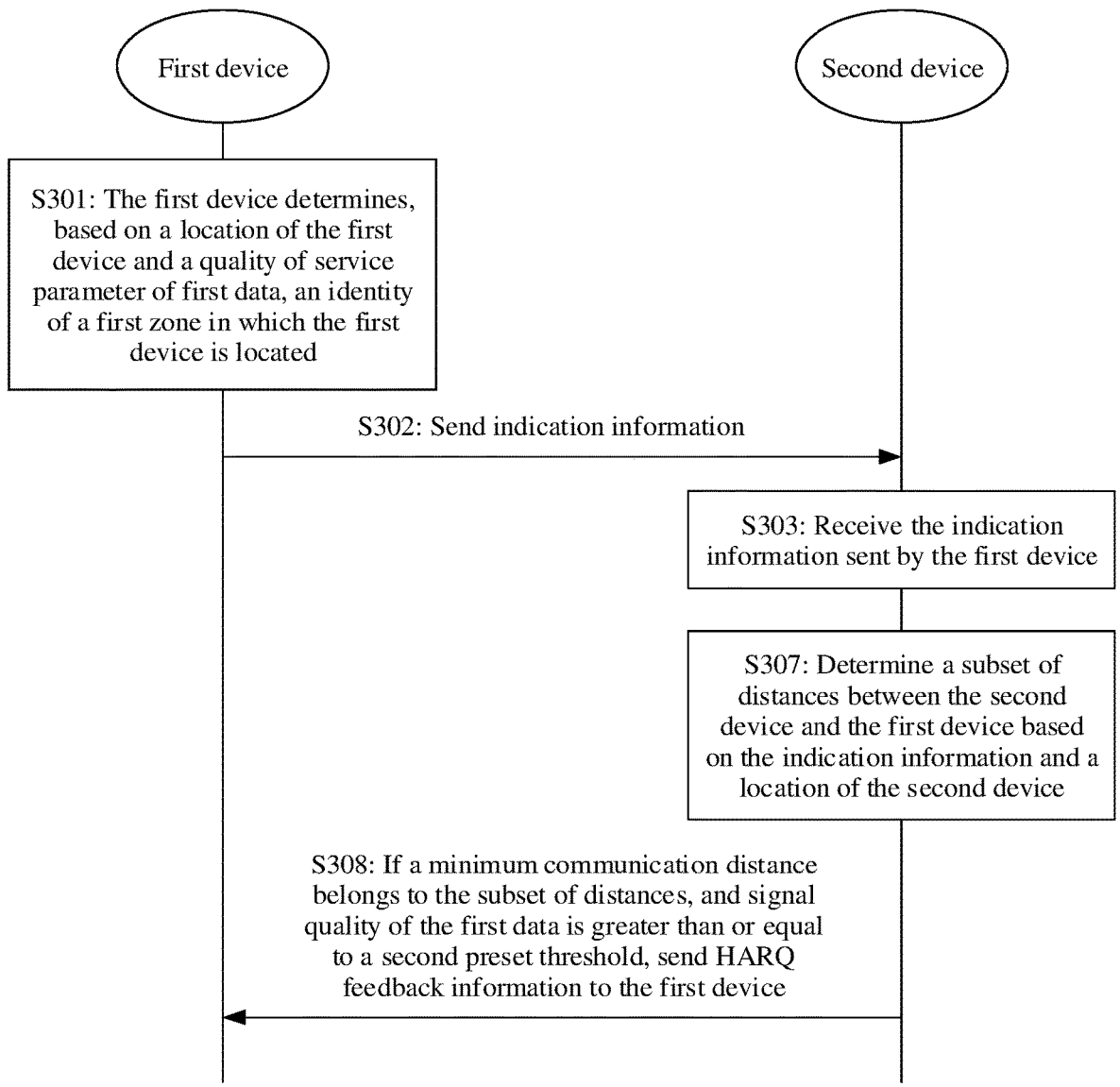
FIG. 9 is another schematic flowchart of a communication method according to an embodiment of this application.

An embodiment of this application further provides a communication method. As shown in FIG. 9, after step S303, the method may further include steps S307 and S308.

S307: The second device determines a subset of distances between the second device and the first device based on the indication information and the location of the second device.

For example, because the location of the first device is indicated by using the first zone at a relatively coarse granularity, the distance between the location of the second device and the location of the first device may be obtained by using the location of the second device and the first zone. It is clear that a minimum distance between the second device and the first device may be calculated based on the location of the second device and an edge that is of the first zone and that is closest to the location of the second device, a maximum distance between the second device and the first device may be calculated based on the location of the second device and an edge that is of the first zone and that is the farthest from the location of the second device, to obtain the subset of distances between the second device and the first device, that is, a set of values that are greater than or equal to the minimum distance and that are less than or equal to the maximum distance.

Figure 10:
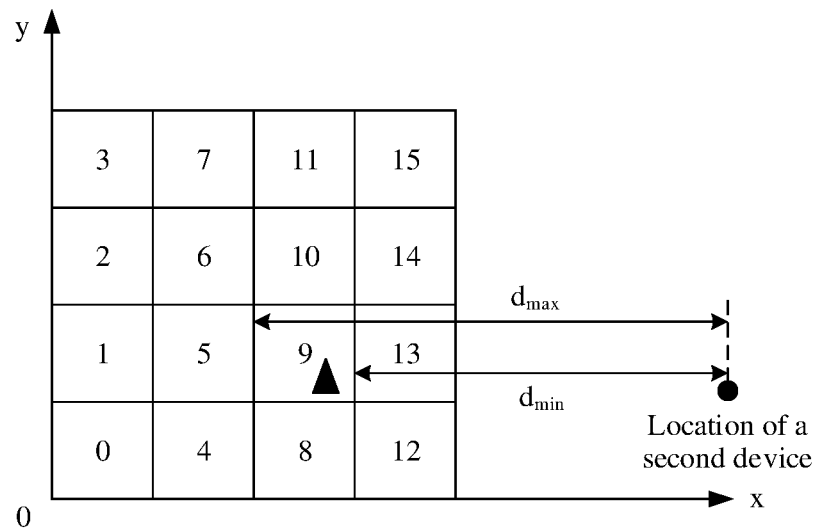
FIG. 10 is another schematic application diagram of a communication method according to an embodiment of this application.

For example, as shown in FIG. 10, the first zone in which the first device is located is a zone whose identity is 9 and in which a black triangle is located in FIG. 10, a black solid dot represents the location of the second device, the minimum distance between the location of the second device and the first zone is $d_{min}$, and the maximum distance between the location of the second device and the first zone is $d_{max}$. Therefore, a subset of distances between the location of the second device and the first zone whose identity is 9 is ($d_{min}$, $d_{max}$).

S308: If the minimum communication distance belongs to the subset of distances, and the signal quality of the first data is greater than or equal to a second preset threshold, the second device sends HARQ feedback information to the first device.

For example, that the minimum communication distance belongs to the subset of distances means that the minimum communication distance is greater than or equal to the minimum distance $d_{min}$ between the location of the second device and the first zone, and is less than or equal to the maximum distance $d_{max}$ between the location of the second device and the first zone. If the minimum communication distance is greater than or equal to $d_{min}$ and is less than or equal to $d_{max}$, whether the signal quality of the first data is greater than or equal to the second preset threshold may be further determined. If the signal quality of the first data is greater than or equal to the second preset threshold, the second device may send an ACK or a NACK to the first device.

For example, as shown in FIG. 10, if the minimum distance $d_{min}$ between the location of the second device and the first zone is 475, the maximum distance $d_{max}$ between the location of the second device and the first zone is 525, and the minimum communication distance between the second device and the first device is 500 meters, whether the signal quality of the first data is greater than or equal to the second preset threshold may be further determined. If the signal quality is greater than or equal to the second preset threshold, the second device may send the ACK or the NACK to the first device.

Optionally, the second device may determine the subset of distances between the second device and the first device based on the indication information and the location of the second device. If the minimum communication distance belongs to the subset of distances, the second device may be located beyond the minimum communication distance, or may be located within the minimum communication distance.

According to the communication method provided in this embodiment of this application, the first device determines, based on the location of the first device and the quality of service parameter of the first data, the identity of the first zone in which the first device is located, and sends the indication information. The second device receives the indication information sent by the first device, and determines the distance between the second device and the first device based on the indication information and the location of the second device. The second device determines the subset of distances between the second device and the first device based on the location of the second device and the identity of the first zone in which the first device is located. If the minimum communication distance belongs to the subset of distances, and the signal quality of the first data is greater than or equal to the second preset threshold, the second device sends the HARQ feedback information to the first device. In this embodiment, the first zone in which the first device is located is determined by using the quality of service parameter of the first data, so that the first zone in which the first device is located can be obtained through more proper division based on the quality of service parameter of the transmitted data, the subset of distances between the second device and the first device may be determined based on the identity of the first zone, and whether to send the feedback information to the first device is further determined based on the signal quality of the first data, to improve data transmission efficiency and reliability, and improve the autonomous driving or advanced driver assistance systems ADAS capability of the electric vehicle.

The foregoing describes, mainly from the perspective of method steps, the solutions provided in the embodiments of this application. It may be understood that, to implement the foregoing functions, a communications device includes a hardware structure and/or a software module for performing a corresponding function. A person skilled in the art should be easily aware that, in combination with modules and algorithm steps of the examples described in the embodiments disclosed in this specification, this application may be implemented by a combination of hardware and computer software. A person skilled in the art may use different methods to implement the described functions for each particular application, but it should not be considered that the implementation goes beyond the scope of this application.

In the embodiments of this application, the communications device may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that, in the embodiments of this application, division into modules is used as an example, and is merely division into logical functions. In an actual implementation, another division manner may be used.

Figure 11:
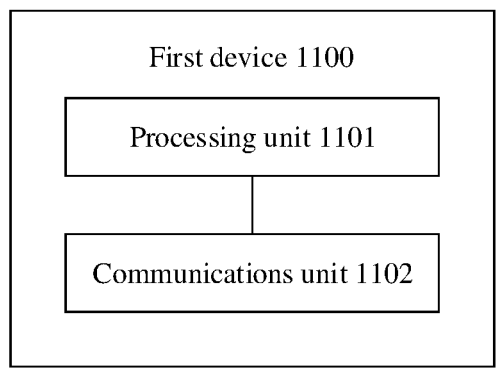
FIG. 11 is a schematic composition diagram of a first device according to an embodiment of this application.

When each function module is obtained through division based on each corresponding function, FIG. 11 is a possible schematic structural diagram of a first device 1100 in the foregoing embodiments. The first device 1100 includes a processing unit 1101 and a communications unit 1102. The processing unit 1101 may perform S301 in FIG. 3. The communications unit 1102 may perform S302 in FIG. 3. It may be understood that the processing unit 1101 may further send and receive information through the communications unit 1102, or may be configured to communicate with another network element, and/or may be configured to perform another process of the technology described in this specification. All related content of the steps in the foregoing method embodiments may be cited in function descriptions of the corresponding function modules. Details are not described herein again.

Figure 12:
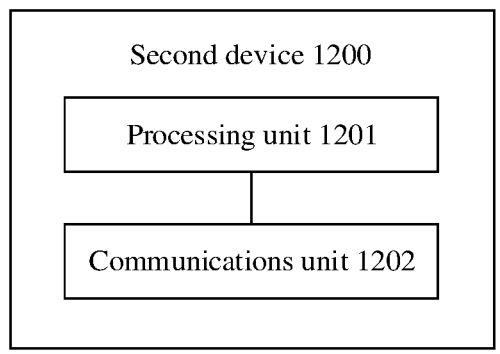
FIG. 12 is a schematic composition diagram of a second device according to an embodiment of this application.

When each function module is obtained through division based on each corresponding function, FIG. 12 is a possible schematic structural diagram of a second device 1200 in the foregoing embodiments. The second device 1200 includes a processing unit 1201 and a communications unit 1202. The processing unit 1201 may perform S304 in FIG. 3 or S307 in FIG. 9. The communications unit 1202 may perform S303 in FIG. 3, S305 in FIG. 7, S306a in FIG. 8(a), S306b in FIG. 8(b), or S308 in FIG. 9. It may be understood that the processing unit 1201 may further send and receive information through the communications unit 1202, or may be configured to communicate with another network element, and/or may be configured to perform another process of the technology described in this specification. All related content of the steps in the foregoing method embodiments may be cited in function descriptions of the corresponding function modules. Details are not described herein again.

Figure 13:
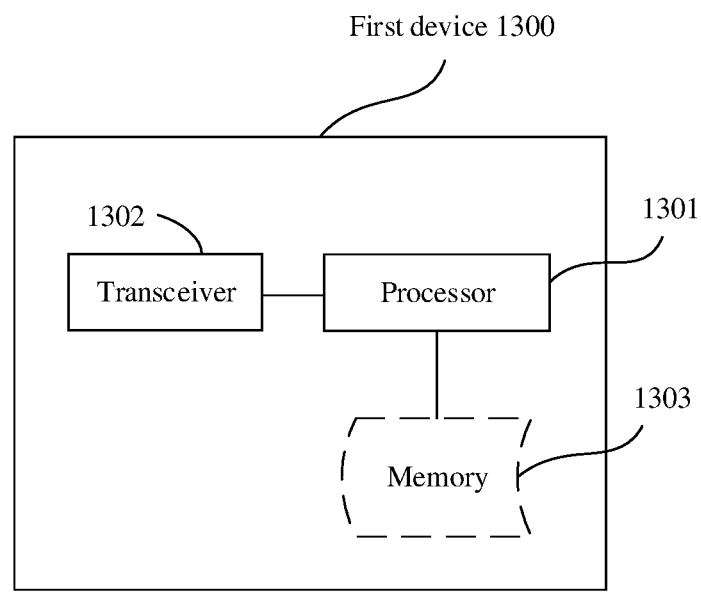
FIG. 13 is another schematic composition diagram of a first device according to an embodiment of this application.

When an integrated unit is used, FIG. 13 is a possible schematic structural diagram of a first device 1300 in the foregoing embodiments. The first device 1300 includes a processor 1301 and a transceiver 1302. The processor 1301 is configured to control and manage an action of the first device 1300. For example, the processor 1301 may perform S301 in FIG. 3. The transceiver 1302 may perform S302 in FIG. 3 and/or another process of the technology described in this specification. The processor 1301 may further send and receive information through the transceiver 1302, or may be configured to communicate with another network element, and/or may be configured to perform another process of the technology described in this specification. Optionally, the first device 1300 may further include a memory 1303, and the memory 1303 is configured to store corresponding program code and data for performing, by the first device 1300, any communication method provided above. The memory 1303 may be a read-only memory (ROM), another type of static storage device capable of storing static information and instructions, a random access memory (RAM), or the like. The first device 1300 may be the communications device shown in FIG. 2. Descriptions of all related content of the components in FIG. 2 may be cited in function descriptions of the corresponding components in FIG. 13. Details are not described herein again.

Figure 14:
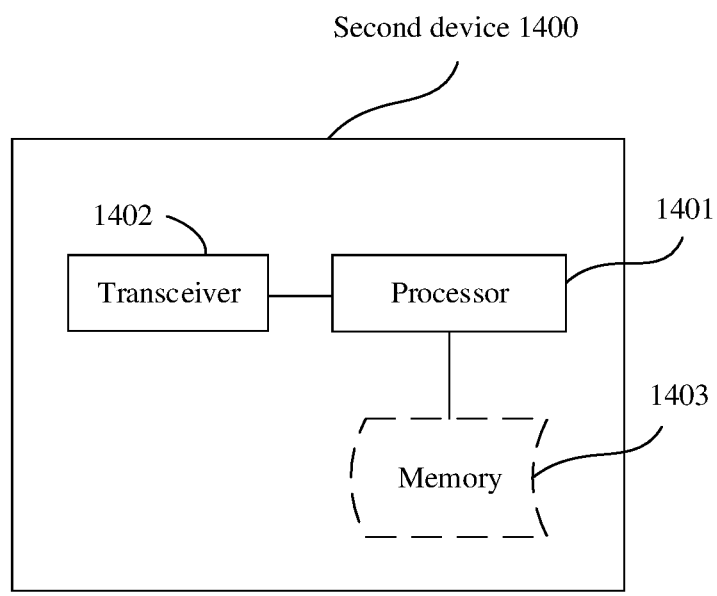
FIG. 14 is another schematic composition diagram of a second device according to an embodiment of this application.

When an integrated unit is used, FIG. 14 is a possible schematic structural diagram of a second device 1400 in the foregoing embodiments. The second device 1400 includes a processor 1401 and a transceiver 1402. The processor 1401 is configured to control and manage an action of the second device 1400. For example, the processor 1401 may perform S304 in FIG. 3 or S307 in FIG. 9. The transceiver 1402 may perform S303 in FIG. 3, S305 in FIG. 7, S306a in FIG. 8(a), S306b in FIG. 8(b), S308 in FIG. 9, and/or another process of the technology described in this specification. The processor 1401 may further send and receive information through the transceiver 1402, or may be configured to communicate with another network element, and/or may be configured to perform another process of the technology described in this specification. Optionally, the second device 1400 may further include a memory 1403, and the memory 1403 is configured to store corresponding program code and data for performing, by the second device 1400, any communication method provided above. The memory 1403 may be a read-only memory (read-only memory, ROM), another type of static storage device capable of storing static information and instructions, a random access memory (RAM), or the like. The second device 1400 may be the communications device shown in FIG. 2. Descriptions of all related content of the components in FIG. 2 may be cited in function descriptions of the corresponding components in FIG. 14. Details are not described herein again.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist as discrete components in the core network interface device.

A person skilled in the art should be aware that in the foregoing one or more examples, functions described in this application may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made based on the technical solutions of this application shall fall within the protection scope of this application.

What is claimed is:

1. A method, performed by a first device or a chip in the first device, the method comprising:

obtaining configuration information, wherein the configuration information comprises a plurality of pieces of required communication distance information and a plurality of zone lengths, wherein the plurality of zone lengths corresponds to the plurality of pieces of required communication distance information respectively, a first length is one of the plurality of zone lengths, first required communication distance information is one piece of the plurality of pieces of required communication distance information, and the first length corresponds to the first required communication distance information;

determining, based on a location of the first device and the first length, a first identity of a first zone in which the first device is located;

sending first indication information to a second device, wherein the first indication information comprises first information, and the first information indicates the first identity;

determining, based on another location of the first device and a second length, a second identity of a second zone, wherein the second zone is a zone in which the first device is located after a location of the first device is updated to the another location, wherein the second length corresponds to second required communication distance information, the second length is one of the plurality of zone lengths, and the second required communication distance information is one piece of the plurality of pieces of required communication distance information; and sending second indication information to the second device, wherein the second indication information comprises third information, and the third information indicates the second identity.

2. The method of claim 1, the method further comprising:
obtaining, based on the first required communication distance information, the first length.

3. The method of claim 1, wherein the first identity meets the following formulas:

$$x_1 = \text{Floor}(x/L)\text{Mod}(Nm);$$

$$y_1 = \text{Floor}(y/L)\text{Mod}(Nm); \text{ and}$$

$$\text{Grid\_id} = y_1 * Nm + x_1; \text{ and}$$

wherein the Grid_id is the first identity, (x, y) is the location of the first device, L is the first length, $Nm=2^{n/2}$, n is a total quantity of bits of the first identity, Floor represents rounding down to an integer, and Mod represents a modulo operation.

4. The method of claim 1, wherein the first indication information further comprises second information, and the second information indicates the first required communication distance information.

5. The method of claim 1, wherein
the first required communication distance information is information of a communication range, and when a distance between the first device and the second device is greater than or equal to the communication range, communications between the first device and the second device are not required to meet a Quality of service (QOS) requirement; or
the first required communication distance information is information of a communication range, and the communication range is configured to be used by the second device to determine whether to send hybrid automatic repeat request (HARQ) information; or the first required communication distance information is information of first data, and the first data is data sent by the first device or the chip in the first device.

6. An apparatus, the apparatus comprising:
a transceiver, configured to obtain configuration information, wherein the configuration information comprises a plurality of pieces of required communication distance information and a plurality of zone lengths, wherein the plurality of zone lengths corresponds to the plurality of pieces of required communication distance information respectively, wherein a first length is one of the plurality of zone lengths, first required communication distance information is one piece of the plurality of pieces of required communication distance information, and the first length corresponds to the first required communication distance information;
at least one processor, configured to determine, based on a location of a first device and the first length, a first identity of a first zone in which the first device is located;
wherein the transceiver is further configured to send first indication information to a second device, wherein the first indication information comprises first information, and the first information indicates the first identity;
wherein the at least one processor is further configured to determine, based on another location of the first device and a second length, a second identity of a second zone, wherein the second zone is a zone in which the first device is located after a location of the first device is updated to the another location, wherein the second length corresponds to second required communication distance information, the second length is one of the plurality of zone lengths, and the second required communication distance information is one piece of the plurality of pieces of required communication distance information; and
wherein the transceiver is further configured to send second indication information to the second device, wherein the second indication information comprises third information, and the third information indicates the second identity.

7. The apparatus of claim 6, wherein the at least one processor is configured to:
obtain, based on the first required communication distance information, the first length.

8. The apparatus of claim 6, wherein the first identity meets the following formulas:

$x_1 = \text{Floor}(x/L)\text{Mod}(Nm);$ $y_1 = \text{Floor}(y/L)\text{Mod}(Nm);$ and $\text{Grid\_id} = y_1 * Nm + x_1;$ and wherein the Grid_id is the first identity, (x, y) is the location of the first device, L is the first length, $Nm=2^{n/2}$, n is a total quantity of bits of the first identity, Floor represents rounding down to an integer, and Mod represents a modulo operation.

9. The apparatus of claim 6, wherein the first information is carried in sidelink control information (SCI).

10. The apparatus of claim 6, wherein the first indication information further comprises second information, and the second information indicates the first required communication distance information.

11. The apparatus of claim 6, wherein the first required communication distance information is information of a communication range, and when a distance between the first device and the second device is greater than or equal to the communication range, communications between the first device and the second device do not need to meet a Quality of service (QOS) requirement; or the first required communication distance information is information of a communication range, and the communication range is configured to be used by the second device to determine whether to send hybrid automatic repeat request (HARQ) information; or the first required communication distance information is information of first data, and the first data is data sent by the first device.

12. A non-transitory computer readable storage medium storing computer program code, wherein when the computer program code is run on a processor, the processor is caused to perform operations comprising:
obtaining configuration information, wherein the configuration information comprises a plurality of pieces of required communication distance information and a plurality of zone lengths, wherein the plurality of zone lengths corresponds to the plurality of pieces of required communication distance information respectively, wherein a first length is one of the plurality of zone lengths, first required communication distance information is one piece of the plurality of pieces of required communication distance information, and the first length corresponds to the first required communication distance information;
determining, based on a location of a first device and the first length, a first identity of a first zone in which the first device is located;
sending first indication information to a second device, wherein the first indication information comprises first information, and the first information indicates the first identity;
determining, based on another location of the first device and a second length, a second identity of a second zone, wherein the second zone is a zone in which the first device is located after a location of the first device is updated to the another location, wherein the second length corresponds to second required communication distance information, the second length is one of the plurality of zone lengths, and the second required communication distance information is one piece of the plurality of pieces of required communication distance information; and
sending second indication information to the second device, wherein the second indication information comprises third information, and the third information indicates the second identity.

13. The medium of claim 12, the operations further comprising:
obtaining, based on the first required communication distance information, the first length.

14. The medium of claim 12, wherein the first identity meets the following formulas:

$x_1 = \text{Floor}(x/L)\text{Mod}(Nm);$ $y_1 = \text{Floor}(y/L)\text{Mod}(Nm);$ and $\text{Grid\_id} = y_1 * Nm + x_1;$ and wherein the Grid_id is the first identity, (x, y) is the location of the first device, L is the first length, $Nm=2^{n/}$ 2, n is a total quantity of bits of the first identity, Floor represents rounding down to an integer, and Mod represents a modulo operation.

15. The medium of claim 12, wherein the first information is carried in sidelink control information (SCI).

16. The medium of claim 12, wherein the first indication information further comprises second information, the second information indicates the first required communication distance information.

17. The medium of claim 12, wherein the first required communication distance information is information of a communication range, and when a distance between the first device and the second device is greater than or equal to the communication range, communications between the first device and the second device do not need to meet a Quality of service (QOS) requirement; or the first required communication distance information is information of a communication range, and the communication range is configured to be used by the second device to determine whether to send hybrid automatic repeat request (HARQ) information; or the first required communication distance information is information of first data, and the first data is data sent by the first device.

\* \* \* \* \*